(12) United States Patent
Leonidov et al.

(10) Patent No.: US 7,929,501 B2
(45) Date of Patent: Apr. 19, 2011

(54) METHODS AND APPARATUS FOR COMMUNICATING INFORMATION USING BEACON SIGNALS

(75) Inventors: Alexander Leonidov, Somerset, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 833 days.

(21) Appl. No.: 11/852,028

(22) Filed: Sep. 7, 2007

(65) Prior Publication Data
US 2008/0062929 A1     Mar. 13, 2008

Related U.S. Application Data

(60) Provisional application No. 60/843,263, filed on Sep. 7, 2006.

(51) Int. Cl.
*H04B 7/216* (2006.01)
(52) U.S. Cl. .................... 370/335; 370/342
(58) Field of Classification Search .......... 370/204–210, 370/328–339
See application file for complete search history.

(56) References Cited

U.S. PATENT DOCUMENTS

| | | | | |
|---|---|---|---|---|
| 6,961,364 | B1 * | 11/2005 | Laroia et al. | 375/132 |
| 6,985,498 | B2 * | 1/2006 | Laroia et al. | 370/478 |
| 7,379,446 | B2 * | 5/2008 | Laroia et al. | 370/345 |
| 2005/0233752 | A1 | 10/2005 | Laroia et al. | |

FOREIGN PATENT DOCUMENTS

GB     2398963     9/2004

OTHER PUBLICATIONS

Jung et al, Use of Periodic Pilot Tones for Identifying Base Stations of FH-OFDMA Systems, IEEE, 3 pages, Mar. 2006.*
Jung et al, Base station identification for FH-OFDMA systems, IEEE, 4 pages, 2004.*
International Search Report—PCT/US07/077919, International Search Authority—European Patent Office—Mar. 4, 2008.
Written Opinion—PCT/US07/077919, International Search Authority—European Patent Office—Mar. 4, 2008.
International Preliminary Report on Patentability, PCT/US07/077919—European Patent Office—Nov. 19, 2008.

* cited by examiner

*Primary Examiner* — Frank Duong
(74) *Attorney, Agent, or Firm* — Sam Talpalatsky; Nicholas J. Pauley; Jonathan T. Velasco

(57) ABSTRACT

Methods and apparatus related to efficiently communicating information, such as base station identification information and/or timing information, via beacon signals are described. Base station identification information and/or timing information is communicated via beacon signals. A beacon coding scheme is utilized in which different base station sectors in the communications system are associated with different subsets of beacon tones, e.g., a sub-set of 4 beacon tones. Different beacon tone sub-sets have at most 1 tone in common. A base station sector transmitter transmits a sequence of beacon signals, in accordance with a predetermined beacon tone hopping pattern, in a recurring timing structure, each beacon signal including one of the tones from its associated beacon tone subset. The structure of the beacon tone subsets and the hopping pattern facilitates efficient communication of information, efficient recovery of information being communicated and/or a simple implementation decoder by a wireless terminal.

64 Claims, 12 Drawing Sheets

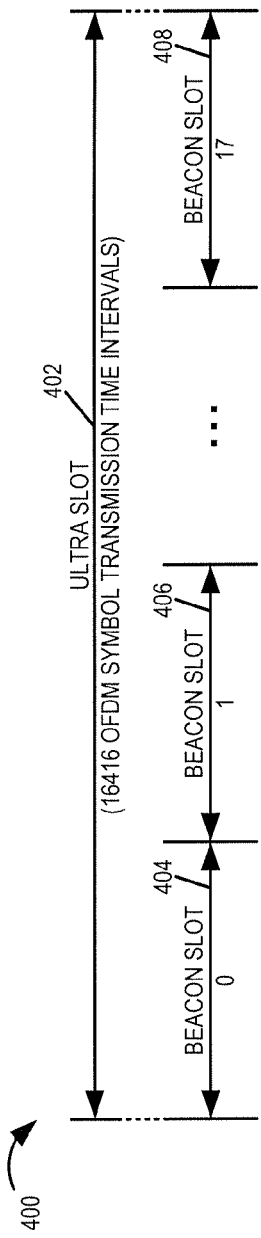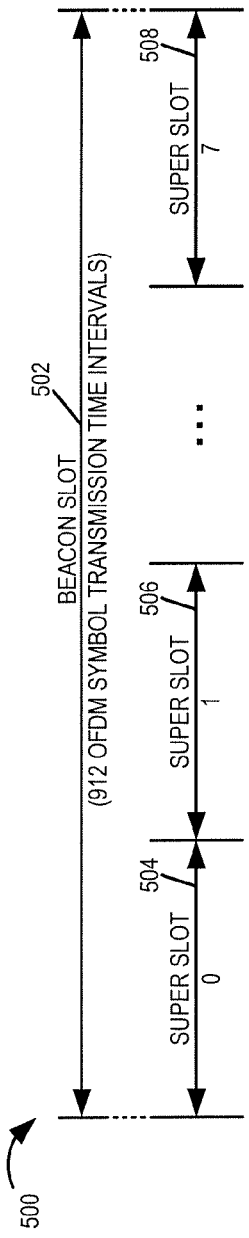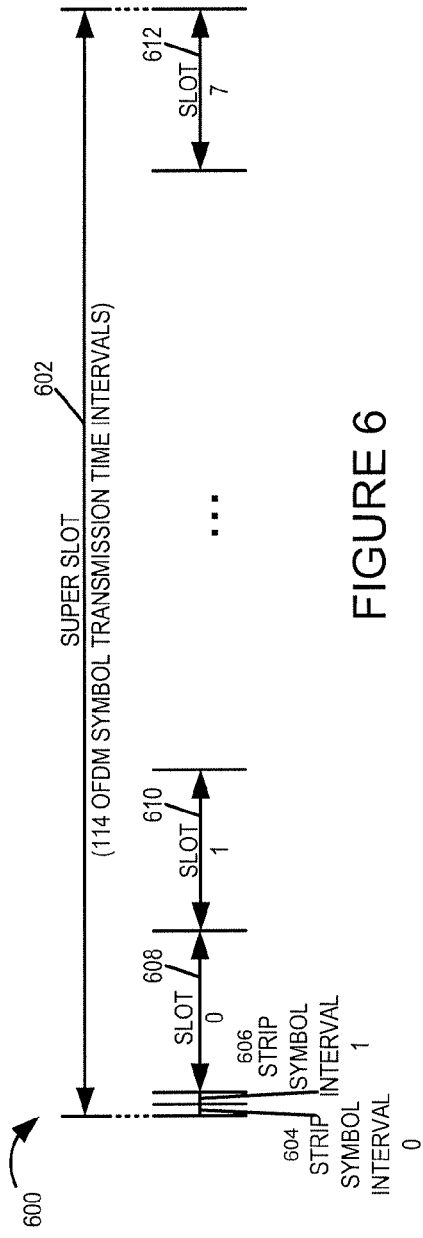

| BEACON SLOT COUNT INDEX IN ULTRA-SLOT | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| BEACON TONE OF SUBSET IN ACCORDANCE WITH HOPPING SEQUENCE | A | B | C | A | D | B | A | C | D | A | B | D | A | C | B | A | D | C |
| BEACON TONE FOR SUBSET $S_0$ | 0 | 12 | 85 | 0 | 107 | 12 | 0 | 85 | 107 | 0 | 12 | 107 | 0 | 85 | 12 | 0 | 107 | 85 |
| BEACON TONE FOR SUBSET $S_1$ | 0 | 17 | 19 | 0 | 99 | 17 | 0 | 19 | 99 | 0 | 17 | 99 | 0 | 19 | 17 | 0 | 99 | 19 |
| BEACON TONE FOR SUBSET $S_2$ | 0 | 21 | 25 | 0 | 104 | 21 | 0 | 25 | 104 | 0 | 21 | 104 | 0 | 25 | 21 | 0 | 104 | 25 |
| ... | | | | | | | | | | | | | | | | | | |
| BEACON TONE FOR SUBSET $S_{285}$ | 31 | 64 | 107 | 31 | 109 | 64 | 31 | 107 | 109 | 31 | 64 | 109 | 31 | 107 | 64 | 31 | 109 | 107 |
| BEACON TONE FOR SUBSET $S_{286}$ | 3 | 43 | 83 | 3 | 109 | 43 | 3 | 83 | 109 | 3 | 43 | 109 | 3 | 83 | 43 | 3 | 109 | 83 |
| BEACON TONE FOR SUBSET $S_{287}$ | 3 | 17 | 31 | 3 | 85 | 17 | 3 | 31 | 85 | 3 | 17 | 85 | 3 | 31 | 17 | 3 | 85 | 31 |

FIGURE 11

METHODS AND APPARATUS FOR COMMUNICATING INFORMATION USING BEACON SIGNALS

RELATED APPLICATIONS

The present application claims the benefit of the filing date of U.S. Provisional Patent Application Ser. No. 60/843,263, filed on Sep. 7, 2006 titled "PILOT HOPPING METHODS AND DEVICES" which is assigned to the assignee of the present application and which is hereby expressly incorporated by reference.

FIELD

Various embodiments relate to wireless communications systems, and more particularly to methods and apparatus which use beacon signaling to communicate information.

BACKGROUND

In wireless communications systems, it is sometimes desirable to be able to communicate information using beacon signals.

Some schemes which use beacon signals may lack redundancy, require a relatively long time to recover communicated information, and/or suffer from possible confusion when beacon signals are received from different base stations at the same time or at nearly the same time.

In view of the above discussion, it would be desirable if improved methods and apparatus for communicating information using beacon signals could be developed. It would be desirable if the improved methods and/or apparatus allowed for one or more of the following: i) relatively rapid recovery of at least some communicated information; ii) redundancy in the communicated information; and iii) the ability to distinguish between information communicated by different base stations.

SUMMARY

Methods and apparatus related to efficiently communicating information via beacon signals are described. Base station identification information and/or timing information is communicated via beacon signals in various embodiments. A beacon coding scheme is utilized in which different base station sectors in the communications system are associated with different sub-sets of beacon tones, e.g., a sub-set of 4 beacon tones. Different beacon tone sub-sets have at most 1 tone in common. In some embodiments, a base station sector transmitter transmits a sequence of beacon signals, in accordance with a predetermined beacon tone hopping pattern, in a recurring timing structure, each beacon signal including one of the tones from its associated beacon tone subset. The structure of the beacon tone subsets and the hopping pattern facilitates one or more of: efficient communication of information; efficient recovery of information being communicated; and/or a simple implementation decoder by a wireless terminal.

An exemplary method of communicating base station identification information in accordance with various embodiments involves storing information indicating a first set of M tones used for communicating base station identification information, wherein M is a positive integer greater than two and transmitting a first repeating sequence of beacon signals, each of said beacon signals using one of said first set of M tones, each of said tones in said first set of M tones being transmitted at least twice during said first repeating sequence, the pattern of consecutive beacon signals in said transmitted sequence communicating timing information in a beacon signal timing structure. An exemplary base station may include, for example, a memory including stored information indicating a first set of M tones used for communicating base station identification information, wherein M is a positive integer greater than two; a transmitter for transmitting beacon signals; and a transmitter control module for controlling the transmitter to transmit a first repeating sequence of beacon signals, each of said beacon signals using one of said first set of M tones, each of said tones in said first set of M tones being transmitted at least twice during said first repeating sequence, the pattern of consecutive beacon signals in said transmitted sequence communicating timing information in a beacon signal timing structure.

An exemplary method of receiving and recovering base station identification information, in accordance with various embodiments includes: storing information indicating mappings between beacon tones and base station identifiers, for each base station identifier said information indicating a mapping to a set of M tones, each of the M tones in a set of M tones associated with a base station identifier being different; sets of M tones associated with different base station identifiers having at most one tone in common, wherein M is a positive integer greater than two; receiving beacon signals transmitted on tones; and recovering base station identification information from a sequence of received beacon signals using said stored information and information determined by said receiver indicating the tones on which the beacon signals were received. An exemplary wireless terminal for receiving and recovering base station identification information comprises: memory for storing information indicating mappings between beacon tones and base station identifiers, for each base station identifier said information indicating a mapping to a set of M tones, each of the M tones in a set of M tones associated with a base station identifier being different; sets of M tones associated with different base station identifiers having at most one tone in common, wherein M is a positive integer greater than two; a receiver for receiving beacon signals transmitted on tones; and a recovery module for recovering base station identification information from a sequence of received beacon signals using said stored information and information determined by said receiver indicating the tones on which the beacon signals were received.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIGS. 4-6 illustrate an exemplary orthogonal frequency division multiplexing (OFDM) downlink timing structure in accordance with various embodiments.

FIG. 11 is a table illustrating exemplary beacon tone hopping for an exemplary embodiment.

DETAILED DESCRIPTION

Figure 1:
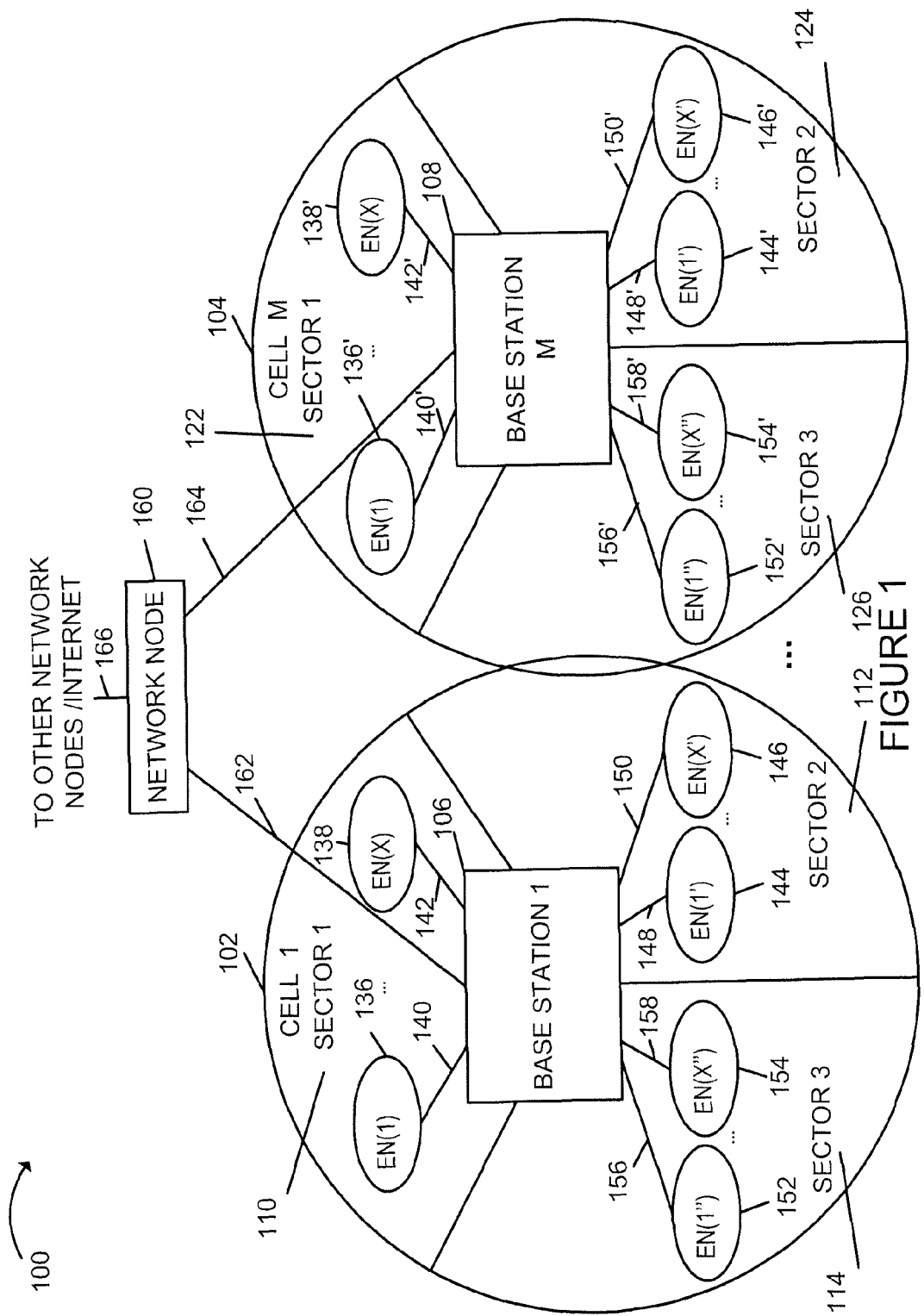
FIG. 1 is a drawing of an exemplary communications system implemented in accordance with various embodiments.

FIG. 1 shows an exemplary communication system 100 implemented in accordance with various embodiments including multiple cells: cell 1 102, cell M 104. Exemplary system 100 is, e.g., an exemplary OFDM spread spectrum wireless communications system such as a multiple access OFDM system. Each cell 102, 104 of exemplary system 100 includes three sectors. Cells which have not be subdivided into multiple sectors (N=1), cells with two sectors (N=2) and cells with more than 3 sectors (N>3) are also possible in accordance with various embodiments. Each sector supports one or more carriers and/or downlink tones blocks. In various embodiments at least some of the downlink tone blocks have a corresponding uplink tone block. Cell 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of end nodes (ENs) in each sector 110, 112, 114. Sector 1 110 includes EN(1) 136 and EN(X) 138 coupled to BS 106 via wireless links 140, 142, respectively; sector 2 112 includes EN(1') 144 and EN(X') 146 coupled to BS 106 via wireless links 148, 150, respectively; sector 3 114 includes EN(1") 152 and EN(X") 154 coupled to BS 106 via wireless links 156, 158, respectively. Similarly, cell M 104 includes base station M 108, and a plurality of end nodes (ENs) in each sector 122, 124, 126. Sector 1 122 includes EN(1) 136' and EN(X) 138' coupled to BS M 108 via wireless links 140', 142', respectively; sector 2 124 includes EN(1') 144' and EN(X') 146' coupled to BS M 108 via wireless links 148', 150', respectively; sector 3 126 includes EN(1") 152' and EN(X") 154' coupled to BS 108 via wireless links 156', 158', respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each end node, e.g. EN 1 136, may be a wireless terminal including a transmitter as well as a receiver. The wireless terminals, e.g., EN(1) 136 may move through system 100 and may communicate via wireless links with the base station in the cell in which the EN is currently located. The wireless terminals, (WTs), e.g. EN(1) 136, may communicate with peer nodes, e.g., other WTs in system 100 or outside system 100 via a base station, e.g. BS 106, and/or network node 160. WTs, e.g., EN(1) 136 may be mobile communications devices such as cell phones, personal data assistants with wireless modems, etc.

Each base station (106, 108) performs downlink signaling. A base station transmits a recurring sequence of beacon signals corresponding to a sector in accordance with a downlink timing and frequency structure and identification information corresponding to the base station sector. Downlink signaling also includes transmitting OFDM symbols conveying user data in accordance with a downlink timing and frequency structure. In some embodiments, the different base station sector transmitters are timing synchronized. In some embodiments, the different base station sector transmitters are not necessarily timing synchronized. For example, in some embodiments, sector transmitters of the same base station are timing synchronized, but sector transmitters from different base stations are not timing synchronized. The beacon signals are generated and transmitted to facilitate easy detection and measurement by a wireless terminal which may or may not be precisely, e.g., to within a cyclic prefix duration, timing synchronized with respect to the attachment point from which the beacon signal is transmitted. In accordance with various embodiments, the base station beacon signaling facilitates the comparison of beacon signals and/or channel estimates corresponding to a plurality of different base station sector attachment points. The base station beacon signals support the communication of base station cell and/or sector identification information and/or timing synchronization information.

Figure 2:
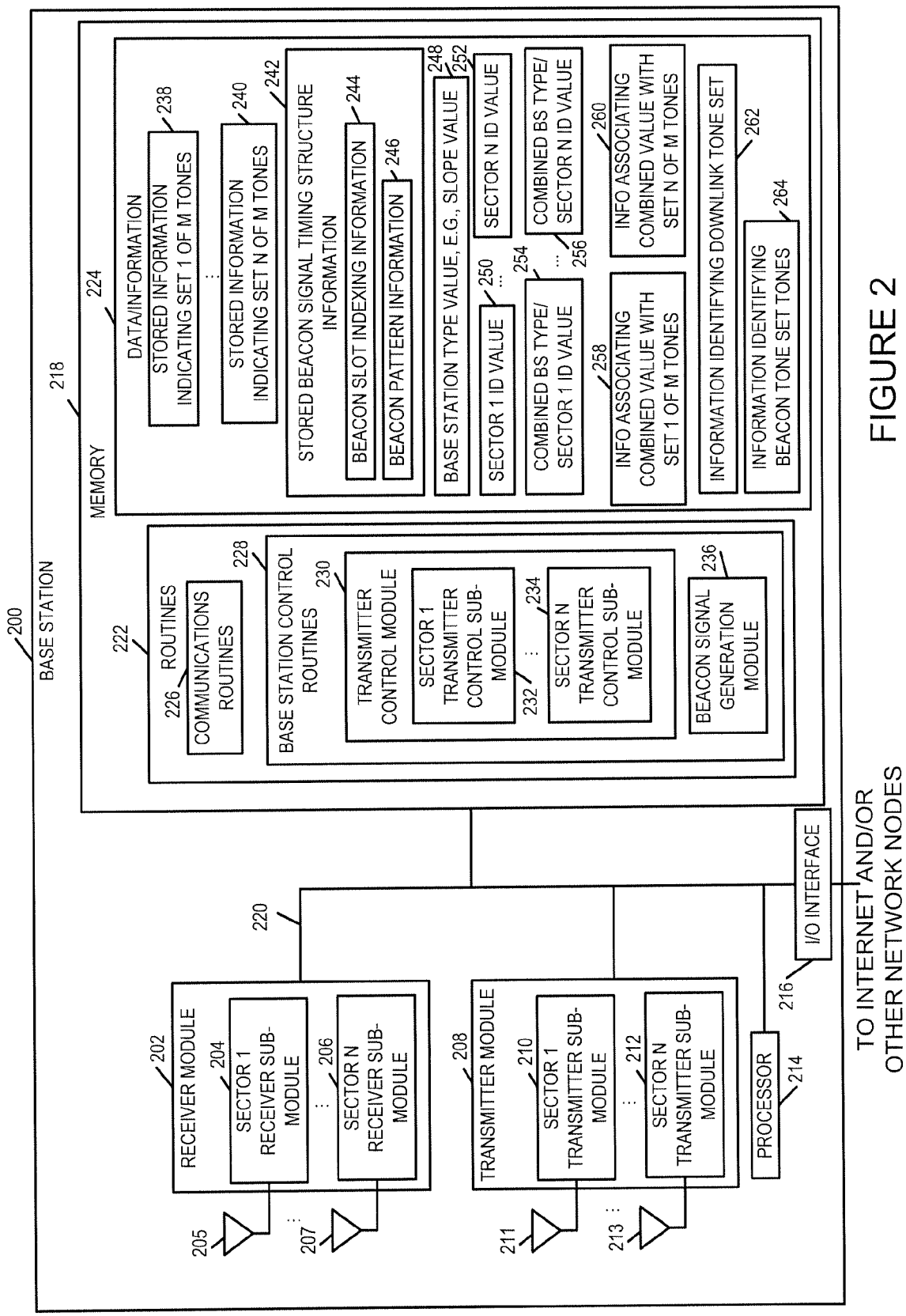
FIG. 2 is a drawing of an exemplary base station in accordance with various embodiments.

FIG. 2 is a drawing of an exemplary base station 200 in accordance with various embodiments. Base station 200 is, e.g., one of the base stations of exemplary communications system 100 of FIG. 1. Exemplary base station 200 includes a receiver module 202, a transmitter module 208, a processor 214, an I/O interface 216 and memory 218 coupled together via a bus 220 over which the various elements may interchange data and information.

Receiver module 202, e.g., an OFDM receiver, includes a plurality of receiver sub-modules corresponding to different sectors (sector 1 receiver sub-module 204, . . . , sector N receiver sub-module 206). Sector 1 receiver sub-module 204 is coupled to sector 1 receive antenna 205 via which the base station 200 receives uplink signals from wireless terminals using or seeking to use a base station attachment point corresponding to sector 1. Sector N receiver sub-module 206 is coupled to sector N receive antenna 207 via which the base station 200 receives uplink signals from wireless terminals using or seeking to use a base station attachment point corresponding to sector N.

Transmitter module 208, e.g., an OFDM transmitter, includes a plurality of transmitter sub-modules (sector 1 transmitter sub-module 210, . . . , sector N transmitter sub-module 212). Sector 1 transmitter sub-module 210 is coupled to sector 1 transmit antenna 211 via which the base station transmits downlink signals. Sector N transmitter sub-module 212 is coupled to sector N transmit antenna 213 via which the base station transmits downlink signals. Transmitted downlink signals include beacon signals, other control information signals and user data signals. In some but not necessarily all embodiments, a beacon signal is a single tone signal. In some embodiments a beacon tone signal is transmitted at a higher power level than the average per tone power level used for the other types of signals, e.g., user data signals, transmitted by the base station. In some embodiments a beacon tone signal is transmitted at a higher per tone average power level than the average per tone power level used for traffic channel signals transmitted by the base station. Traffic channels are channels used to communicate user data for example, program data, text data, and/or speech data. In some but not necessarily all embodiments the average per tone power level of a beacon signal is several times higher than the average per tone power level of non-beacon signals, e.g. two, ten, and sometimes 20 or more times the average per tone power level of non-beacon signals. The use of relatively high power levels for beacons signals, in some but not necessarily all embodiments, facilitates easy detection of these signals.

In some embodiments, separate receivers are used for each sector of a base station. In some embodiments, separate transmitters are used for each sector of a base station.

I/O interface 216 couples the base station 200 to the Internet and/or other network nodes, e.g., other base stations, routes, home agent nodes, AAA nodes, etc. I/O interface 216, by coupling the base station 200 to a backhaul network, allows a wireless terminal using a base station attachment point of base station 200 to participate in communications session with another wireless terminal using an attachment point of a different base station.

Memory 218 includes routines 222 and data/information 224. The processor 214, e.g., a CPU, executes the routines 222 and uses the data/information 224 in memory 218 to control the operation of the base station 200 and implement methods, e.g., the method of flowchart 1300 of FIG. 13.

Routines 222 include a communications routine 226 and base station control routines 228. The communications routine 226 implements the various communications protocols used by the base station 200. The base station control routines 228 include a transmitter control module 230 and a beacon signal generation module 236. The transmitter control module 230 includes a plurality of sector sub-modules (sector 1 transmitter control sub-module 232, . . . , sector N transmitter control sub-module 234).

Data/information 224 includes information identifying a downlink tone set 262, information identifying beacon tone set tones 264, stored information indicating sets of M tones (stored information indicating set 1 of M tones 238, . . . , stored information indicating set N of M tones 240), stored beacon signal timing structure information 242, a base station type value 248, and sector identification values associated with the various sectors of base station (sector 1 ID value 250, . . . , sector N ID value 252). Data/information 224 also includes a plurality of identification values representing a combination of the base station type value of base station 200 and the sector value (combined base station type/sector 1 ID value 254, . . . , combined base station type/sector N ID value 256). In addition data/information 224 includes information associating a combined value with a particular set of M tones to be used for beacon signals (information 258 associating combined value of information 254 with information of set 1 of M tones 238, . . . , information 260 associating combined value of information 256 with information of set N of M tones 240). Stored beacon signal timing structure information 242 includes beacon slot indexing information 244 and beacon pattern information 246.

Transmitter control module 230 controls the transmitter module 208 to transmit a first repeating sequence of beacon signals, each of said beacon signals using one of the first set of M tones, each of said tones in the first set of M tones being transmitted at least twice during the first repeating sequence, the pattern of consecutive beacon signals in the transmitted sequence communicating timing information in a beacon signal timing structure. Transmitter control module 230 also controls the transmitter 208 to transmit a second repeating sequence of beacon signals, each of said beacon signals using one of the second set of M tones, each of said tones in the second set of M tones being transmitted at least twice during the second repeating sequence, the pattern of consecutive beacon signals in the transmitted sequence communicating timing information in a beacon signal timing structure. More specifically, individual sector transmitter control sub-modules (232, . . . , 234) in transmitter control module 230 control corresponding individual sector transmitter sub-modules (210, . . . , 212) in the transmitter module 208. For example, the first repeating sequence of beacon signals using the first set of M tones may be transmitted via sector 1 transmitter sub-module 210 under control of sector 1 transmitter control sub-module 232. Similarly, the second repeating sequence of beacon signals using the second set of M tones may be transmitted via sector N transmitter sub-module 212 under the control of sector N transmitter control sub-module 234.

Beacon signal generation module 236 generates a beacon signal to be transmitted by transmitter module 208 under the control of transmitter control module 230. In some embodiments, a beacon signal is a single tone high power signal. A generated beacon signal is generated for a particular sector in accordance with the set of M beacon tones corresponding to that particular sector and in accordance with the stored beacon timing structure information 242.

In one exemplary embodiment, the information identifying a downlink tone set 262 identifies a set of 113 contiguous OFDM tones representing a downlink tone block for a particular carrier used by base station 200. In one such embodiment, the information identifying beacon tone set tones 264 identifies 64 tones from the set of downlink tones which can be, and sometimes are, used to carry beacon signals in the communications system. Base station type value 248 is, e.g., an identifier associated with the base station and/or cell. The base station type value, in some embodiments, is locally unique in the communications system, but may be, and sometimes is, reused in different portions of the communications system by different base stations. In one exemplary embodiment, the base type value is referred to as a slope value, e.g., corresponding to a slope associated with pilot tone signals. The sector ID values (250, . . . , 252) are used to identify different sectors of the base station 200. In one exemplary three sector embodiment, the sector ID value is one of three different values corresponding to a sector designation. Combined value (254, . . . , 256) represent a value obtained by combining the base station type value for the base station with the sector type value for the particular sector. In one example, the combined value is an integer in the range of 0. 287. For example, the exemplary communications system supports 96 different base station type values and 3 different sector values. Information associating combined value with set 1 of M tones 258 maps the value of information 254 to stored set of M tones 238. Similarly, information associating combined value with set N of M tones 258 maps the value of information 256 to stored set of M tones 240.

Stored information indicating set 1 of M tones 238 includes information identifying M tones to be used for beacon signaling by a base station base station sector transmitter sub-module. Stored information indicating set N of M tones includes information identifying a different set of M tones to be used for beacon signaling by a different base station sector transmitter sub-module. In one exemplary embodiment, M=4 and there is at most 1 tone that is common in set of M tones of information 238 and the set of M tones of information 240. In some embodiments, a set of M tones is an ordered set of M tones, e.g., the first tone is designated an A tone, the second tone is designated a B tone, the third tone is designated a C tone, and the fourth tone is designated a D tone.

Stored beacon signal timing structure information 242 includes beacon signal slot indexing information 244 and beacon pattern information. For example, in one exemplary embodiment, the beacon slot indexing information indicates that there are 18 indexed beacon slots (0, . . . 17) in a ultraslot. In one such embodiment, the beacon pattern information 246 identifies that the beacon tones follow the beacon tone designation pattern ABCADBACDABDACBADC corresponding to the indexed 18 beacon slots of the ultraslot.

In various embodiments, M equals 4, and a time position within the beacon signal timing structure is communicated in each set of three consecutive transmitted beacon signals from a set of beacon signals corresponding to a sector, e.g., from a first set of beacon signals. In some embodiments, the first and second transmitted sequences each include the same number of beacon signals, e.g., 18. In some embodiments, beacons signals from different sectors of the same base station are transmitted concurrently, e.g., from different sector transmitter sub-modules.

In various embodiments, the set of M tones in the first subset are different from one another, e.g., information 238 identifies M different tones, and the set of M tones in the second subset are different from one another, e.g., information 240 identifies M different tones. In some embodiments, within the first set of tones the difference between the highest and lowest frequency tone is at least 10 tones thereby providing frequency diversity. In some embodiments, within the first set of tones the difference between the highest and lowest tones is at least 30 tones thereby providing frequency diversity.

In various embodiments, the tones of the first and second sets of tones are member of a third set of tones, said third set of tones being tones which can be used to transmit beacon signals, said third set of tones including less than 70 percent of the set of downlink tones. For example, in one exemplary embodiment the set of downlink tones is a set of 113 contiguous OFDM tones, sometimes referred to as a downlink tone block, the third set of tones is a subset of the downlink tone block including 64 tones, and the tones identified by each of the M sets of tones (238, . . . , 240) are from the 64 tones of the third set of tones.

Figure 3:
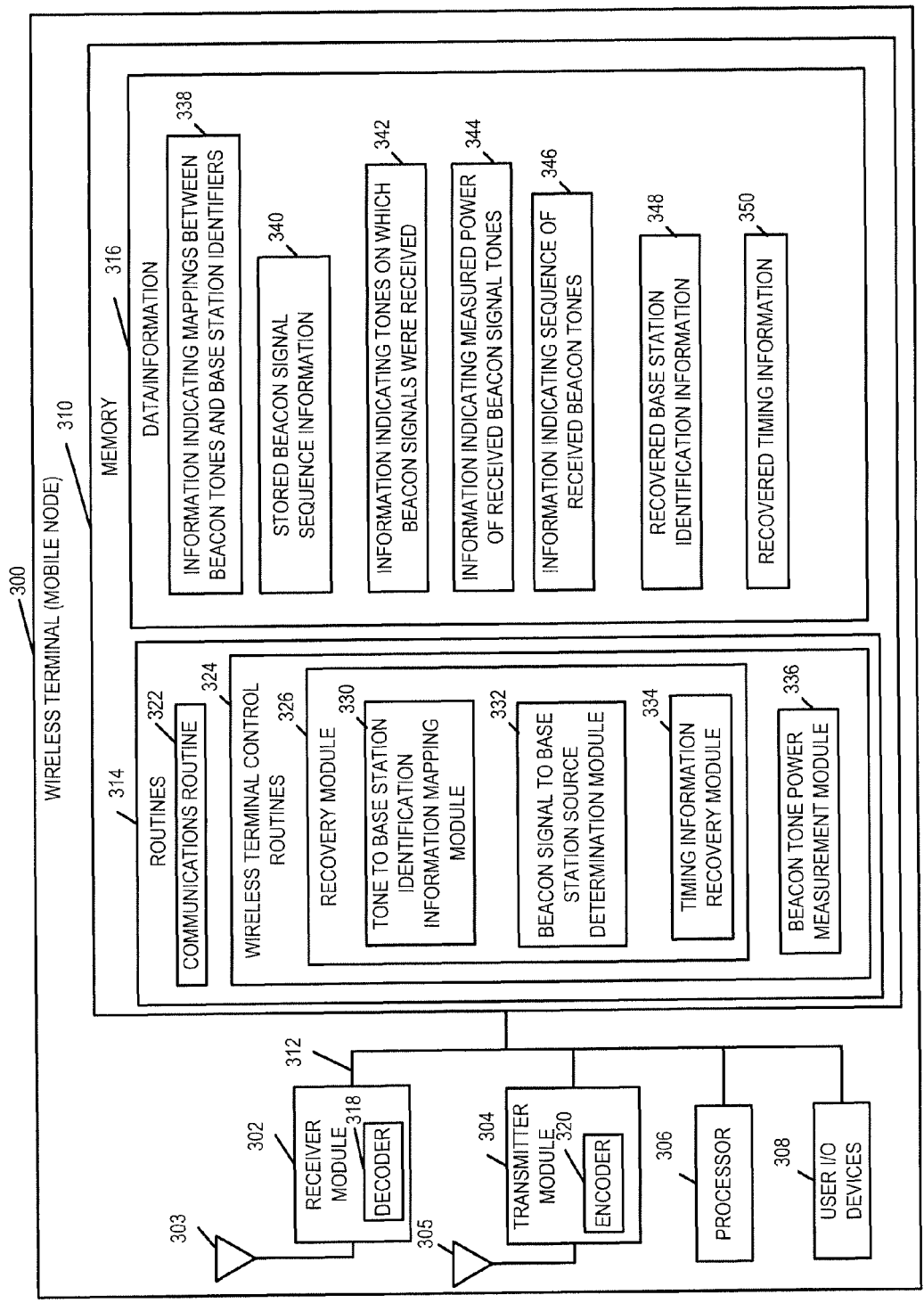
FIG. 3 is a drawing of an exemplary wireless terminal, e.g., mobile node, in accordance with various embodiments.

FIG. 3 is a drawing of an exemplary wireless terminal, e.g., mobile node, in accordance with various embodiments. Exemplary wireless terminal 300 is, e.g., one of the end nodes of system 100 of FIG. 1. Exemplary wireless terminal 300 includes a receiver module 302, a transmitter module 304, a processor 306, user I/O devices 308 and memory 310 coupled together via a bus 312 over which the various elements may interchange data and information.

Receiver module 302, e.g., an OFDM receiver, is coupled to receive antenna 303 via which the wireless terminal 300 receives downlink signals from base stations. Received downlink signals include beacon signals, other control information signals, and user data signals. Receiver module 302 receives beacon signals communicated on tones, e.g., OFDM tones. In some embodiments, a received beacon signal from a base station sector includes a single beacon tone. Receiver module 302 includes a decoder module 318 for decoding at least some of the received downlink signals.

Transmitter module 304, e.g., an OFDM transmitter, is coupled to transmit antenna 305 via which the wireless terminal transmits uplink signals to a base station attachment point. Transmitter module 304 includes an encoder module 320 which encodes at least some of the uplink information to be conveyed.

In some embodiments, a single antenna is used for transmitter and receiver module. In some embodiments, multiple antennas are used for at least one of the receiver and the transmitter, e.g., in combination with MIMO techniques.

User I/O devices 308 include, e.g., microphone, speaker, keyboard, keypad, mouse, display, camera, etc. User I/O devices 308 allow a user of wireless terminal 300 to input data/information, access output data/information, and control at least some functions of the wireless terminal, e.g., attempt to initiate a communications session.

Memory 310 includes routines 314 and data/information 316. The processor 306, e.g., a CPU, executes the routines 314 and uses the data/information 316 in memory 310 to control the operation of the wireless terminal 300 and implement methods, e.g., the method of flowchart 1400 of FIG. 14.

Routines 314 include a communications routines 322 and wireless terminal control routines 324. The communications routine 322 implements the various communications protocols used by the wireless terminal 300. Wireless terminal control routines 324 include a recovery module 326 and a beacon tone power measurement module 336. The recovery module 326 includes a tone to base station identification information mapping module 330, a beacon signal to base station source determination module 332 and a timing information recovery module 334.

Recovery module 326 recovers base station identification information from a sequence of received beacon signals using stored information and information determined by the receiver indicating the tones on which the beacon signals were received.

Beacon signal power measurement module 336 determines a power level associated with a received beacon tone. In some embodiments, at times, the recovery module 326 uses determined received beacon tone power information to identify beacon tones transmitted from the same base station sector transmitter.

Tone to base station identification information mapping module 330 determines which base station identifier corresponds to two different received beacon signals transmitted on different tones by a base station transmitter, e.g., a base station sector transmitter.

Beacon signal to base station source determination module 332 uses signal strength to identify beacon signals from the same transmitter when multiple beacon signals are received from different transmitters during the same symbol time period.

Timing information recovery module 334 recovers timing information indicating a point in a recurring downlink timing structure corresponding to a point at which at least one beacon signal was transmitted.

Data/information 316 includes information indicating mappings between beacon tones and base station identifiers 338, stored beacon signal sequence information 340, information indicating tones on which beacon signals were received 342, information indicating measured power of received beacons signal tones 344, information indicating a sequence of received beacon tones 346, recovered base station identification information 348 and recovered timing information 350.

Information indicating mappings between beacon tones and base station identifiers 338 includes, for each base station identifier, information indicating a mapping to set of M tones, each of the M tones in a set of M tones associated with a base station identifier being different, and a pair of sets of M tones associated with different base station identifiers having at most one tone in common, where M is a positive integer greater than 2. In some embodiments, M=4. In one exemplary embodiment there are 288 different base station identifiers and 288 corresponding sets of M tones. Stored beacon signal sequence information 340 includes information indicating an order in which tones in a tone set corresponding to a base station identifier are to be transmitted before the sequence is repeated, e.g., information indicating an ordered beacon tone sequence corresponding to a particular base station sector transmitter.

In various embodiments, in each set of M tones corresponding to a base station identifier there is a difference between the highest frequency tones and the lowest frequency tone of at least 10 tones thereby providing frequency diversity. In some embodiments, in a first set of M tones corresponding to a base station identifier there is a difference between the highest frequency tones and the lowest frequency tone of at least 30 tones thereby providing frequency diversity.

In some embodiments, each of the sets of M tones are members of a third set of tones, said third set of tones being tones which can be used to transmit beacon signals, said third set of tones being a subset of a set of downlink tones, said third set of tones including less than 70 percent of the set of downlink tones. In one exemplary embodiments, the set of downlink tones is a set of 113 OFDM contiguous tones, the third set of tones is a set of 64 tones, and each set of M tones is a set of 4 tones.

FIGS. 4-6 illustrate an exemplary orthogonal frequency division multiplexing (OFDM) downlink timing structure in accordance with various embodiments. Drawing 400 of FIG. 4 illustrates an exemplary ultra slot 402 which has a duration of 16416 OFDM symbol transmission time intervals. Ultra slot 402 includes 18 beacon slots (beacon slot 0 404, beacon slot 1 406, . . . , beacon slot 17 408). Drawing 500 of FIG. 5 illustrates an exemplary beacon slot 502 which has a duration of 912 OFDM symbol transmission time intervals. Beacon slot 502 may be any of the beacon slots (404, 406, . . . , 408) of FIG. 4. Beacon slot 502 includes 8 super slots (super slot 0 504, super slot 1 506, . . . , super slot 7 508). Drawing 600 of FIG. 6 illustrates an exemplary super slot 602 which has a duration of 114 OFDM symbol transmission time intervals. Super slot 602 may be any of the super slots (504, 506, 508) of FIG. 5. Super slot 602 includes a strip symbol interval 0 604, a strip symbol interval 1 606, and 8 slots (slot 0 608, slot 1 610, . . . , slot 7 612). Exemplary strip symbol interval 0 604 and exemplary strip symbol interval 1 606 each has a duration of an OFDM symbol transmission time interval.

In some embodiments, the strip intervals are used primarily for various broadcast signaling. In various embodiments, at least some of the strip intervals are used to convey a beacon signal. In some embodiments, the strip intervals do not convey any downlink user data. In various embodiments, a beacon signal may be, and sometimes is, transmitted in a pair of successive strip intervals (604, 606). In some embodiments, the first pair of strip symbol intervals at the start of a beacon slot are used to convey a beacon signal.

Figure 7:
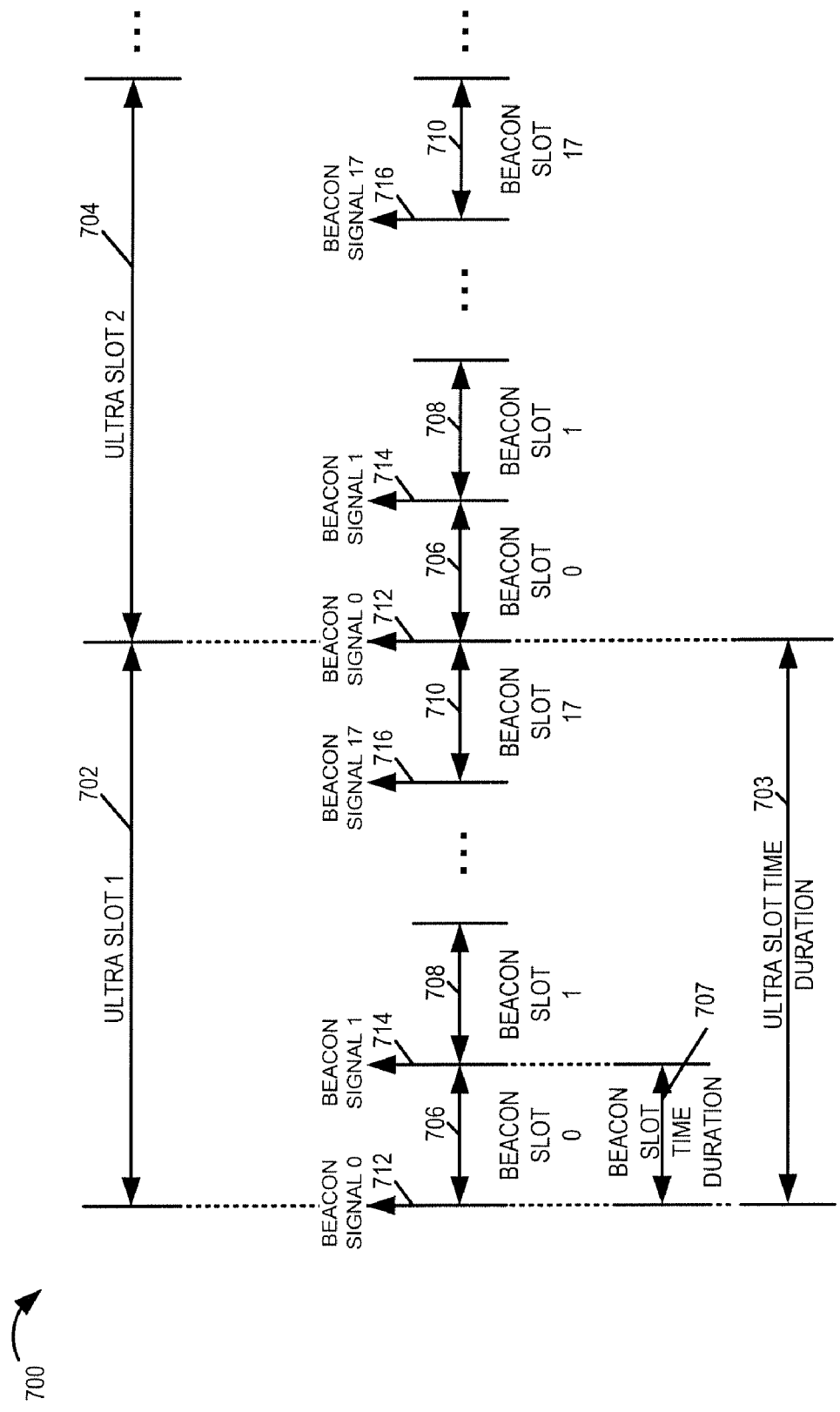
FIG. 7 is a drawing illustrating exemplary beacon signaling from a base station sector, implemented in accordance with various embodiments.

FIG. 7 is a drawing 700 illustrating exemplary beacon signaling from a base station sector, implemented in accordance with various embodiments. Drawing 700 illustrates 2 successive ultra slots (ultra slot 1 702, ultra slot 2 704), each ultra slot has an ultra slot time duration 703. Ultra slot 1 702 includes 18 indexed beacon slots (beacon slot 0 706, beacon slot 1 708, . . . , beacon slot 17 710). Each beacon slot (706, 708, . . . , 710) includes a corresponding beacon signal (beacon signal 0 712, beacon signal 1 714, . . . , beacon signal 17 716), respectively. The pattern of beacon signaling, in this exemplary embodiment, repeats for the first ultra slot 702 to the second ultra slot 704. In some other embodiments, the pattern of beacon signaling may repeat on a different time interval, e.g., a superultra slot basis, said superulta slot including multiple ultra slots, or a portion of an ultraslot. The interval between successive beacon signals is a beacon slot time duration 707. In this example, a beacon signal is transmitted during the two strip intervals in the first super slot of each beacon slot.

In accordance with a feature of various embodiments, a base station sector is associated with an identifier, e.g., an identifier which is generated from (i) a base station type identifier, e.g., a slope value, and (ii) a sector type identifier, e.g., a sector type value, and the generated identifier corresponds to a sequence of beacon signals transmitted from that sector. Different base station sectors correspond to different sequences of beacon signals. In one exemplary embodiment there are 288 different identifier possibilities, and a particular base station sector in the communications system correspond to one of those possibilities.

Figure 8:
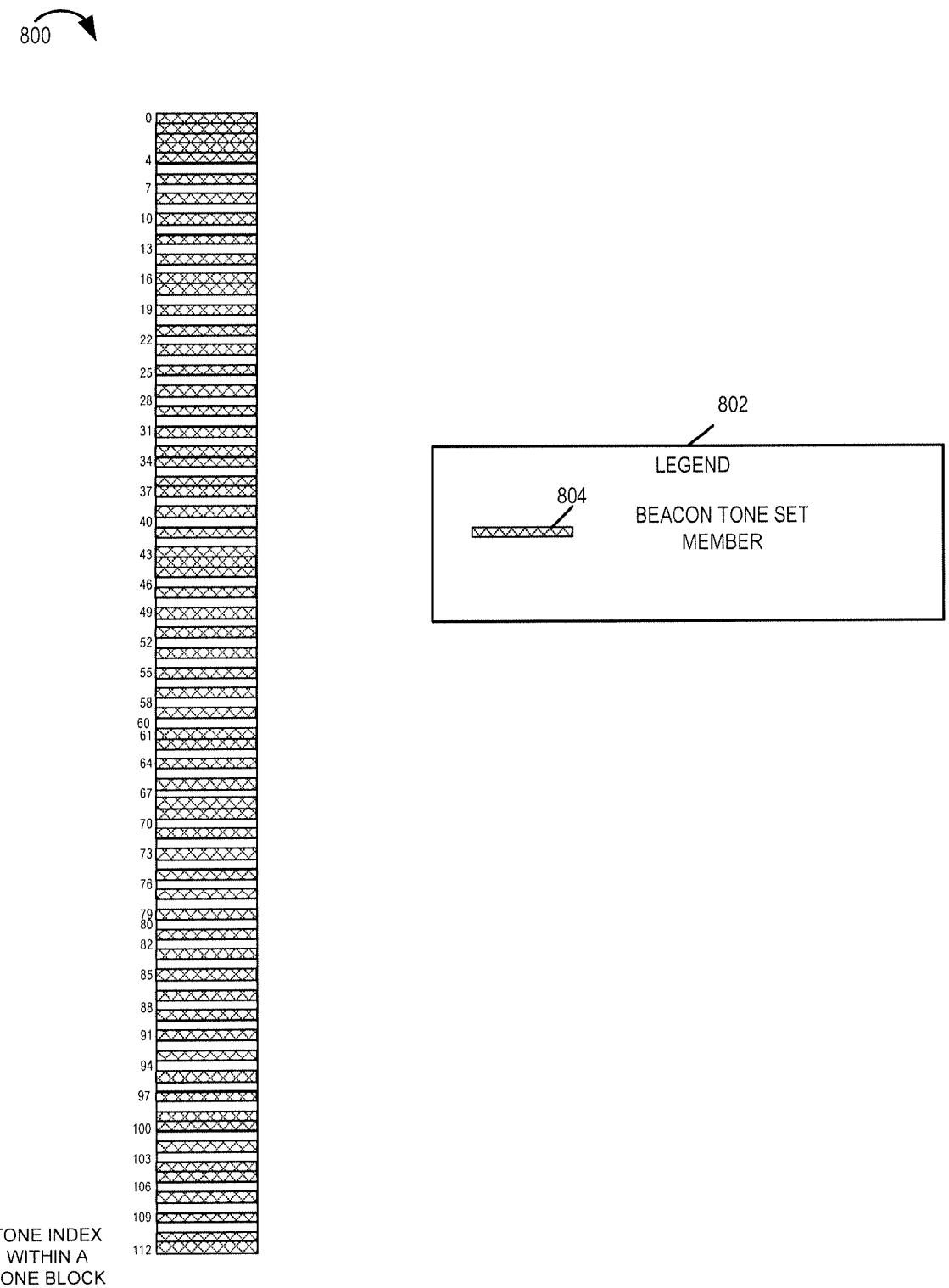
FIG. 8 illustrates features of beacon signaling used in some embodiments in which beacon signals are designated to use some tones of a downlink tone block but are restricted from other tones of the downlink tone block.

FIG. 8 illustrates features of beacon signaling used in some embodiments. In the example of FIG. 8, the drawing 800 includes an exemplary downlink tone block of 113 tones (tone index 0, tone index 1, . . . , tone index 112) identifying that a beacon signal tone can be on 64 specific indexed tones of the tone block, but does not occur on the other 49 tones. In some embodiments, an individual beacon signal uses one tone from the set of 64 tones. Legend 802 identifies that members of the beacon tone set are indicated by crosshatch shading, as indicated by example block 804. Tones with index values {0, 1, 2, 3, 4, 6, 8, 10, 12, 14, 16, 17, 19, 21, 23, 25, 27, 29, 31, 33, 34, 36, 37, 39, 41, 43, 44, 45, 47, 49, 51, 53, 55, 57, 59, 61, 62, 64, 66, 68, 69, 71, 73, 75, 77, 79, 81, 83, 85, 87, 89, 91, 93, 95, 97, 99, 100, 102, 104, 105, 107, 109, 111, 112} correspond tones which can be used to convey a beacon signal.

Figure 9:
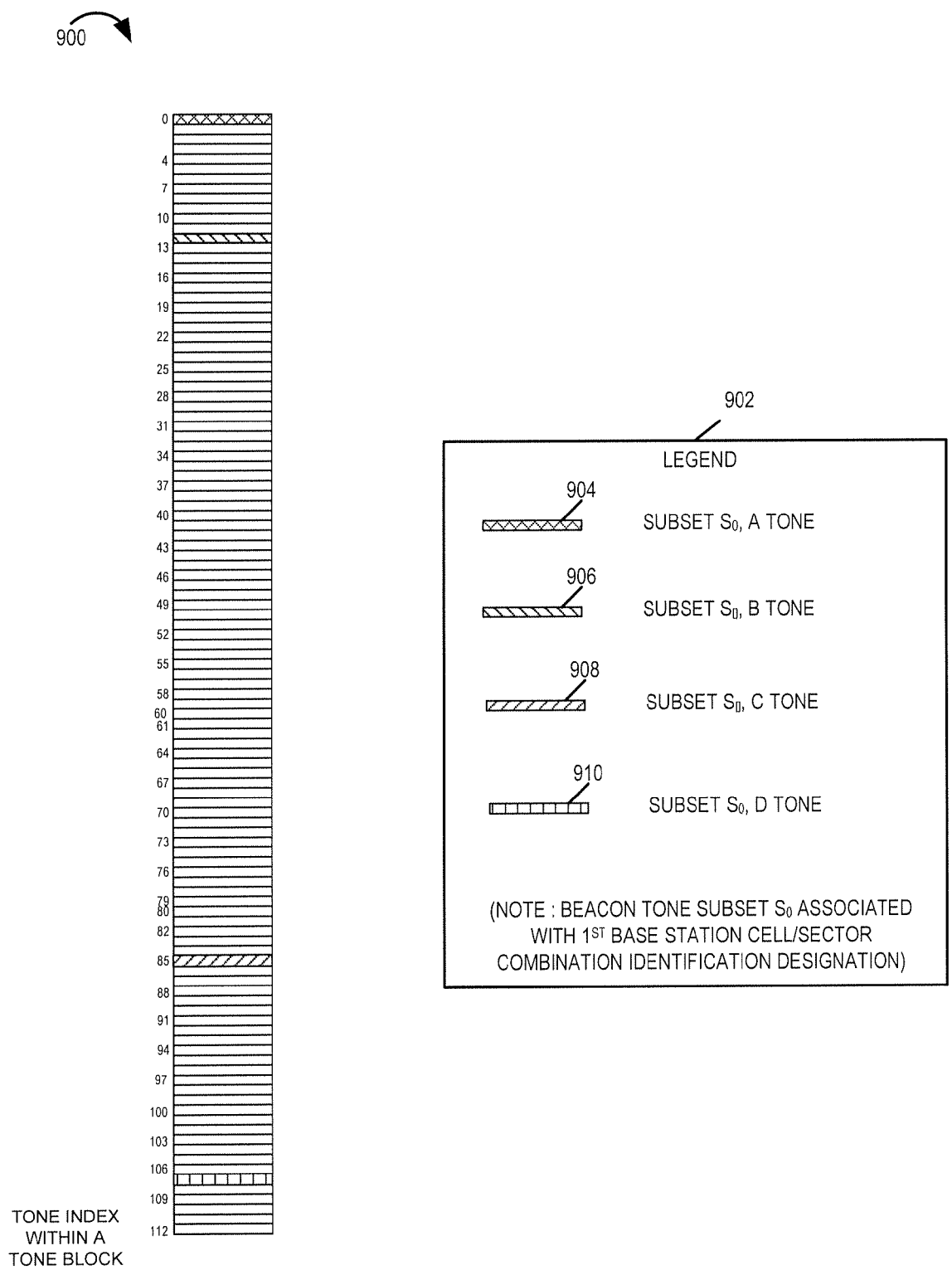
FIG. 9 illustrates an exemplary downlink tone block and identifies that beacon signal tones associated with a first beacon signal subset $S_0$ are tones with index values {0, 12, 85, 107}.

FIG. 9 illustrates a drawing 900 that includes an exemplary downlink tone block of 113 tones (tone index 0, tone index 1, . . . , tone index 112) and identifies that beacon signal tones associated with a first beacon signal subset $S_0$ are tones with index values {0, 12, 85, 107}. Legend 902 indicates that the first beacon tone subset $S_0$ is associated with a $1^{st}$ base station cell/sector combination identification designation. Legend 902 also indicates that the first beacon tone subset $S_0$ is an ordered subset. In this example ordering position within the subset $S_0$ is associated with the letters A, B, C and D. The A tone of the subset $S_0$, which is the first position member of the subset, is identified by crosshatch shading as indicated by example block 904, which corresponds to tone with index=0 within the tone block. The B tone of the subset $S_0$, which is the second position member of the subset, is identified by descending slanted line shading from left to right as indicated by example block 906, which corresponds to tone with index=12 within the tone block. The C tone of the subset $S_0$, which is the third position member of the subset, is identified by ascending slanted line shading from left to right as indicated by example block 908, which corresponds to tone with index=85 within the tone block. The D tone of the subset $S_0$, which is the fourth position member of the subset, is identified by vertical line shading as indicated by example block 910, which corresponds to tone with index=107 within the tone block.

Figure 10:
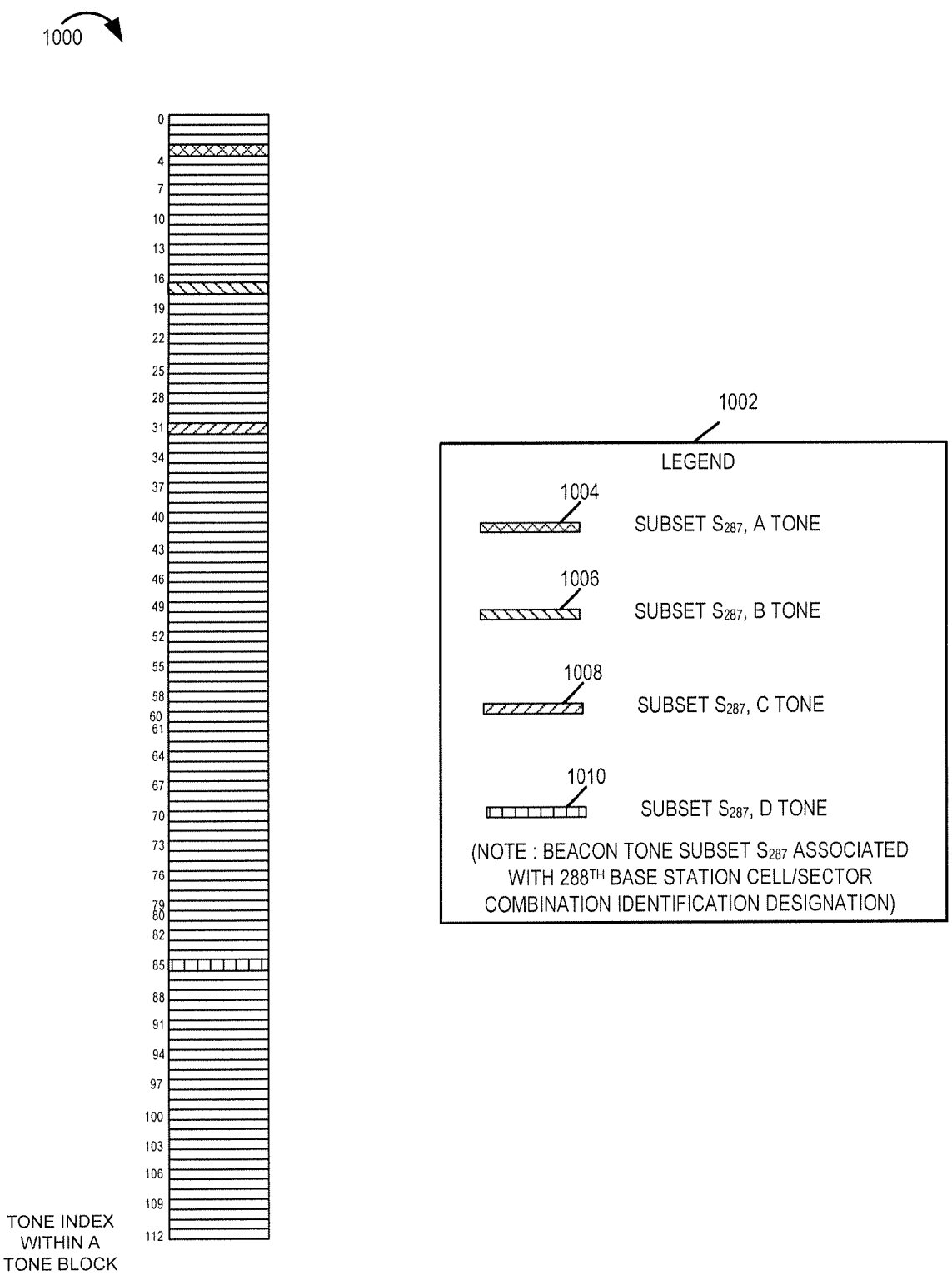
FIG. 10 illustrates the exemplary downlink tone block and identifies that beacon signal tones associated with a 288th beacon signal subset $S_{287}$ are tones with index values {3, 17, 31, 85}.

FIG. 10 illustrates a drawing 1000 that includes an exemplary downlink tone block of 113 tones (tone index 0, tone index 1, . . . , tone index 112) and identifies that beacon signal tones associated with a 288th beacon signal subset $S_{287}$ are tones with index values {3, 17, 31, 85}. Legend 1002 indicates that the 288th beacon tone subset $S_{287}$ is associated with a $288^{th}$ base station cell/sector combination identification designation. Legend 1002 also indicates that the 288th beacon tone subset $S_{287}$ is an ordered subset. In this example ordering position within the subset $S_{287}$ is associated with the letters A, B, C and D. The A tone of the subset $S_{287}$, which is the first position member of the subset, is identified by crosshatch shading as indicated by example block 1004, which corresponds to tone with index=3 within the tone block. The B tone of the subset $S_{287}$, which is the second position member of the subset, is identified by descending slanted line shading from left to right as indicated by example block 1006, which corresponds to tone with index=17 within the tone block. The C tone of the subset $S_{287}$, which is the third position member of the subset, is identified by ascending slanted line shading from left to right as indicated by example block 1008, which corresponds to tone with index=31 within the tone block. The D tone of the subset $S_{287}$, which is the fourth position member of the subset, is identified by vertical line shading as indicated by example block 1010, which corresponds to tone with index=85 within the tone block. Note that in subset $S_{287}$ there are four distinct tones. Also note that only one tone, tone index=85 is common to both subset $S_0$ and subset $S_{287}$. In various embodiments, for any pair of two different beacon tone subsets used in the system, there is at most one common tone. This property facilities rapid identification by a wireless terminal of the identifier associated with the subset of beacon tones.

FIG. 11 is a table 1100 illustrating exemplary beacon tone hopping for an exemplary embodiment. In the exemplary embodiment, there are 18 indexed beacon slots in an ultraslot, and the pattern repeats for each ultra-slot. In this example, there are 288 beacon tones subsets, each beacon tone subset associated with a different base station cell/sector identifier value, each beacon tone subset includes four beacon tones which are designated as an A tone, a B tone, a C tone, and a D tone, and a pair of different subsets have at most one tone in common.

Row 1102 indicates the beacon slot count index in an ultra slot (0, 1, 2, 3, 4, 5, 6, 7, 8, 9, 10, 11, 12, 13, 14, 15, 16, 17). Row 1104 indicates the tone of a subset to be used in accordance with an exemplary hopping sequence in terms of letters A, B, C, D. The sequence is {A, B, C, A, D, B, A, C, D, A, B, D, A, C, B, A, D, C} corresponding to beacon slots {0, 1, 2, 3, 4, 5, 6, 7, 8, 9, 10, 11, 12, 13, 14, 15, 16, 17}, respectively. Row 1106 indicates that the beacon tone pattern in terms of tone index for subset $S_0$, where $S_0$ is the subset of FIG. 9, is {0, 12, 85, 0, 107, 12, 0, 85, 107, 0, 12, 107, 0, 85, 12, 0, 107, 85}. Row 1108 indicates that the beacon tone pattern in terms of tone index for subset $S_1$ is {0, 17, 19, 0, 99, 17, 0, 19, 99, 0, 17, 99, 0, 19, 17, 0, 99, 19}. Row 1110 indicates that the beacon tone pattern in terms of tone index for subset $S_2$ is {0, 21, 25, 0, 104, 21, 0, 25, 104, 0, 21, 104, 0, 25, 21, 0, 104, 25}. Row 1112 indicates that the beacon tone pattern in terms of tone index for subset $S_{285}$ is {31, 64, 107, 31, 109, 64, 31, 107, 109, 31, 64, 109, 31, 107, 64, 31, 109, 107}. Row 1114 indicates that the beacon tone pattern in terms of tone index for subset $S_{286}$ is {3, 43, 83, 3, 109, 43, 3, 83, 109, 3, 43, 109, 3, 83, 43, 3, 109, 83}. Row 1116 indicates that the beacon tone pattern in terms of tone index for subset $S_{287}$, where $S_{287}$ is the subset of FIG. 10, is {3, 17, 31, 3, 85, 17, 3, 31, 85, 3, 17, 85, 3, 31, 17, 3, 85, 31}.

Figure 12:
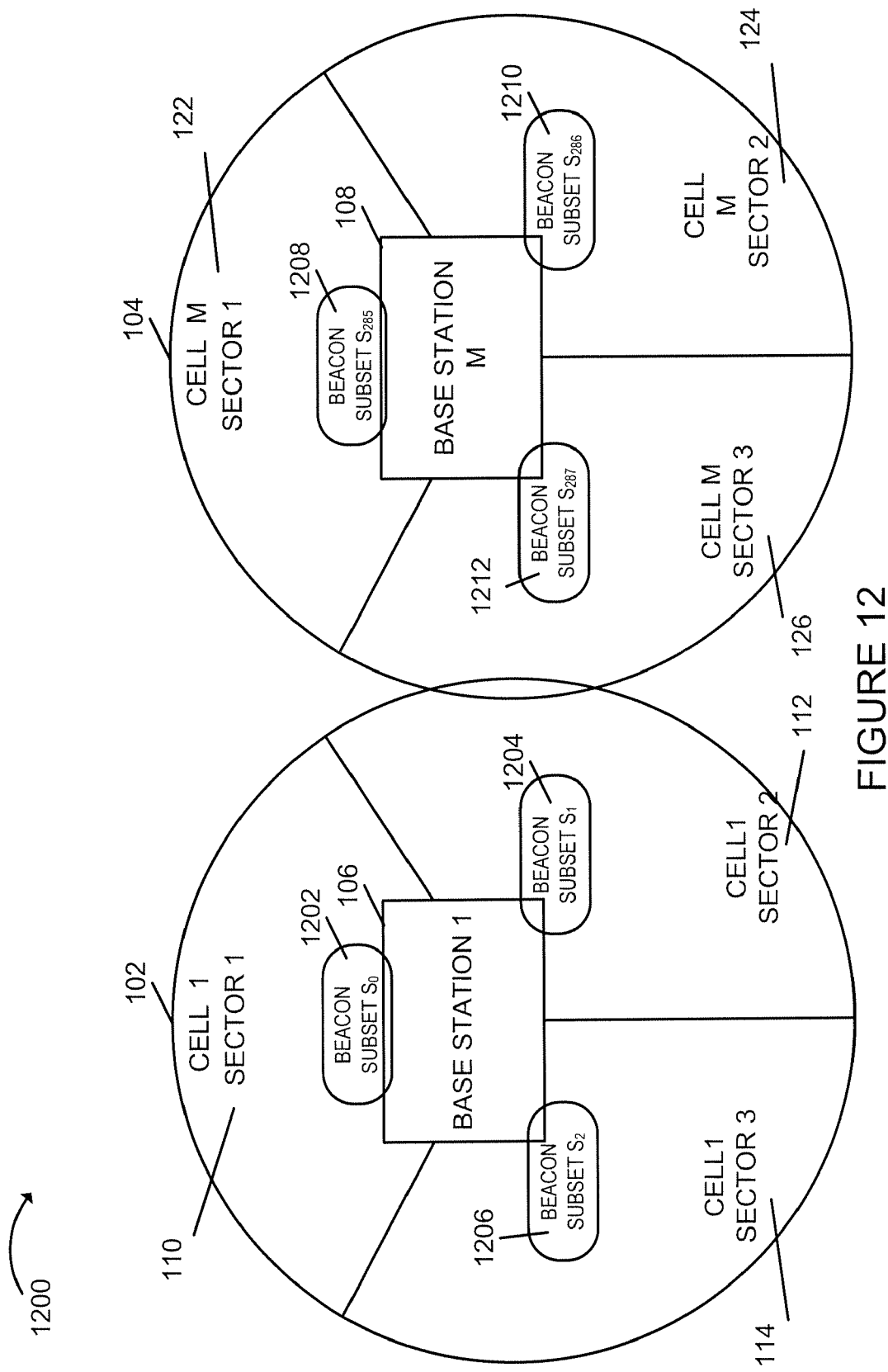
FIG. 12 illustrates a feature of using different beacon tone subsets in different sectors in the system in accordance with various embodiments.

FIG. 12 is a drawing 1200 including two cell of the exemplary system 100 of FIG. 1 and illustrating a feature of using different beacon tone subsets in different sectors in the system. In this example, base station 1 106 of cell 1 102 uses: beacon subset $S_0$ information 1202 for beacon signaling in sector 1 110, beacon subset $S_1$ information 1204 for beacon signaling in sector 2 112, and beacon subset $S_2$ information 1206 for beacon signaling in sector 3 114. Continuing with the example, base station M 108 of cell M 104 uses: beacon subset $S_{285}$ information 1208 for beacon signaling in sector 1 122, beacon subset $S_{286}$ information 1210 for beacon signaling in sector 2 124, and beacon subset $S_{287}$ information 1212 for beacon signaling in sector 3 126.

Beacon subset 0 information 1202 includes the information conveyed by row 1106 of table 1100 of FIG. 11. Beacon subset 1 information 1204 includes the information conveyed by row 1108 of table 1100 of FIG. 11. Beacon subset 2 information 1206 includes the information conveyed by row 1110 of table 1100 of FIG. 11. Beacon subset 285 information 1208 includes the information conveyed by row 1112 of table 1100 of FIG. 11. Beacon subset 286 information 1210 includes the information conveyed by row 1114 of table 1100 of FIG. 11. Beacon subset 287 information 1212 includes the information conveyed by row 1116 of table 1100 of FIG. 11.

In one exemplary embodiment, during a predetermined time, e.g., the start, of each beaconslot a base station sector transmits a single tone beacon signal with the selected tone being in accordance with the beacon subset information. FIG. 7 illustrates exemplary beacon signals being transmitted from a base station sector.

Figure 13:
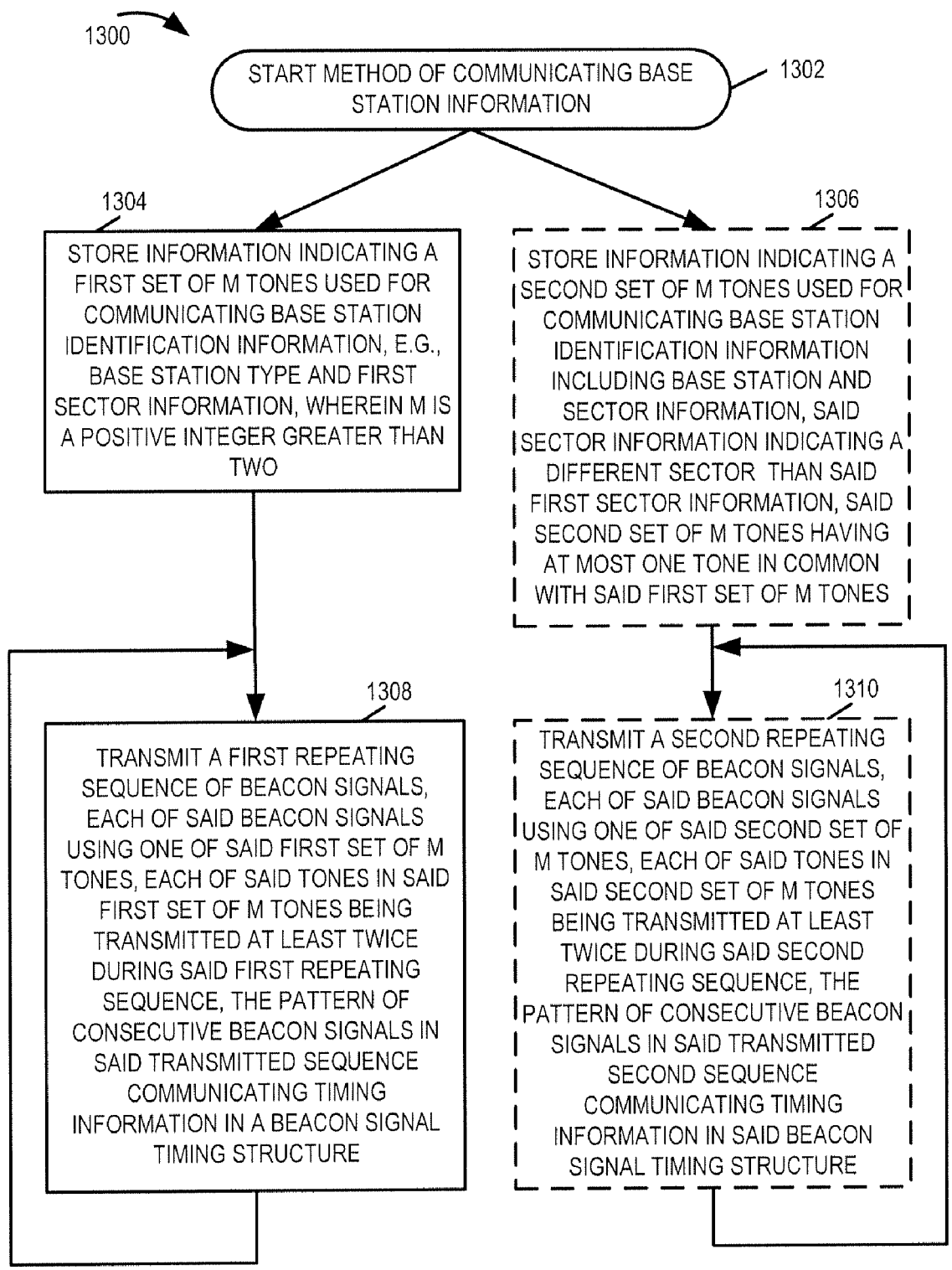
FIG. 13 is a flowchart of an exemplary method of communicating base station information in accordance with various embodiments.

FIG. 13 is a flowchart 1300 of an exemplary method of communicating base station information in accordance with various embodiments. The exemplary method starts in step 1302, where initialization is performed, and proceeds from start step 1302 to steps 1304. In some embodiments, the exemplary method is performed by a base station, e.g., base station 200 of FIG. 2. In some embodiments, e.g., some embodiments, in which the base station is a multi-sector base station, operation also proceeds from step 1302 to step 1306.

Returning to step 1304, in step 1304, the base station stores information indicating a first set of M tones used for communicating base station identification information, e.g., base station type information and first sector information, wherein M is a positive integer greater than 2. In some embodiments M=4. Operation proceeds from step 1304 to step 1308. In step 1308, the base station transmits a first repeating sequence of beacon signals, each of said beacon signals using one of said first set of M tones, each of said tones in said first set of M tones being transmitted at least twice during the first repeating sequence, the pattern of consecutive beacon signals in said transmitted sequence communicating timing information in a beacon signal timing structure. Step 1308 is repeated on an ongoing basis.

Returning to step 1306, in step 1306, the base station stores information indicating a second set of M tones used for communicating base station identification information including base station type information and sector information, said sector information indicating a different sector than said first sector information, said second set of M tones having at most one tone in common with said first set of M tones. Operation proceeds from step 1306 to step 1310. In step 1310, the base station transmits a second repeating sequence of beacon signals, each of said beacon signals using one of said second set of M tones, each of said tones in said second set of M tones being transmitted at least twice during said second repeating sequence, the pattern of consecutive beacon signals in said transmitted sequence communicating timing information in a beacon signal timing structure. Step 1310 is repeated on an ongoing basis.

In various embodiments, the M tones in the first subset are different from one another; and the M tones in the second subset are different from one another.

In some embodiments, within the first set of M tones the difference between the highest frequency tone and the lowest frequency tone is at least 10 tones thereby providing frequency diversity. In some such embodiments, the difference between the highest frequency tone and the lowest frequency tone is at least 30 tones thereby providing frequency diversity.

In various embodiments, the first and second tones are members of a third set of tones, said third set of tones being tones which can be used in the communications system to transmit beacon signals, said third set of tones being a subset of downlink tones, said third set of tones including less than 70 percent of the set of downlink tones. For example, in one embodiment, the set of downlink tones is a set of 113 tones and the third set of tones which can be used to carry a beacon signal is a set of 64 tones.

In one exemplary embodiment, M is equal to 4 and a time position within the beacon signal timing structure is communicated in each set of three consecutive transmitted beacon signals from the first set of beacon signals. In some embodiments, the first and second transmitted sequences each include the same number of beacon signals. In one exemplary embodiment the number of beacon signals in each of the first and second transmitted sequences is 18.

Figure 14:
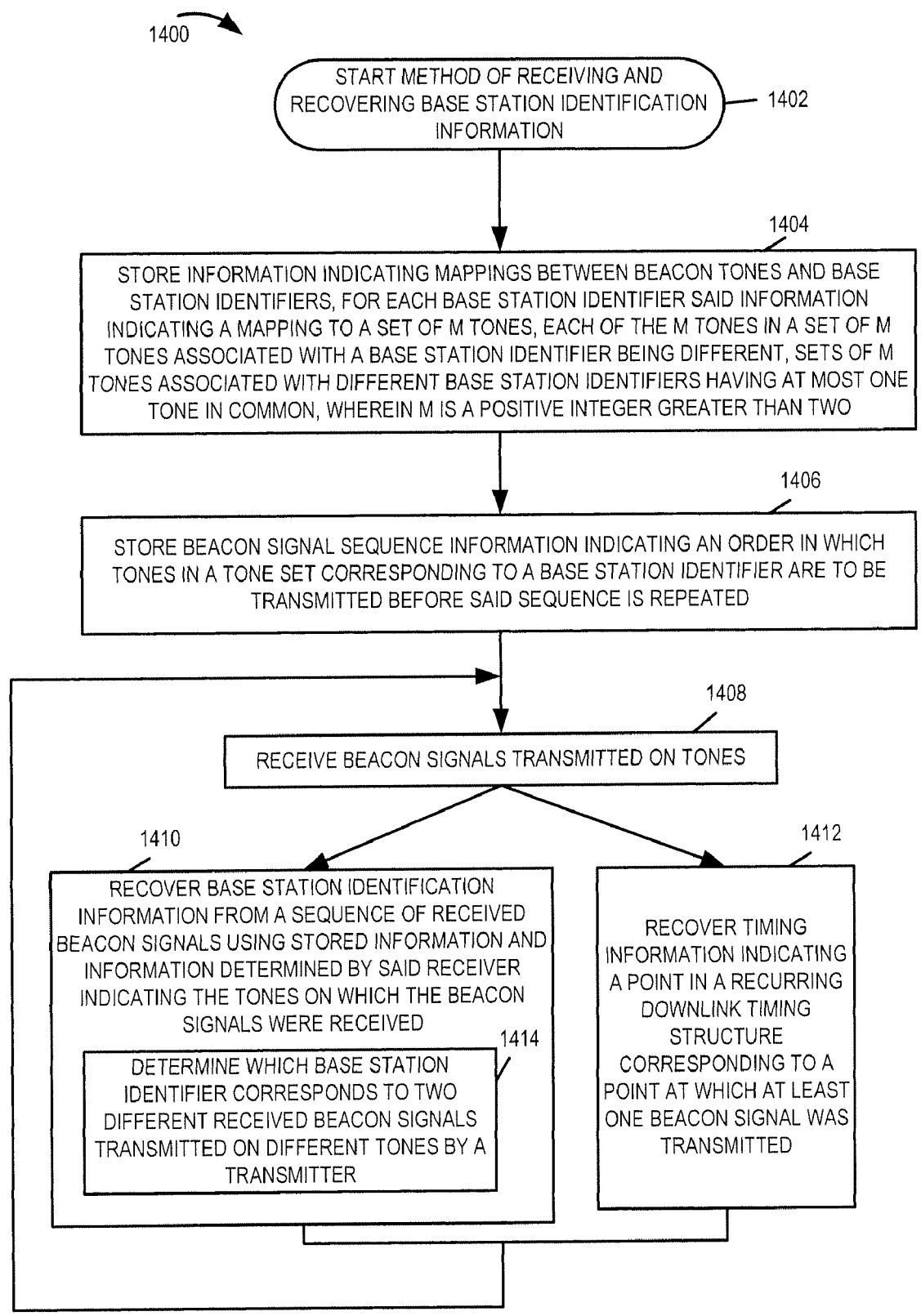
FIG. 14 is a flowchart of an exemplary method of receiving and recovering base station identification information in accordance with various embodiments.

FIG. 14 is a flowchart 1400 of an exemplary method of receiving and recovering base station identification information. The exemplary method of flowchart 1400 is performed, e.g., by wireless terminal 300 of FIG. 3. Operation starts in step 1402, where initialization is performed and proceeds to step 1404. In step 1404, the wireless terminal stores information indicating mappings between beacon tones and base station identifiers, for each base station identifier said information indicating a mapping to a set of M tones, each of the M tones in a set of M tones associated with a base station identifier being different, sets of M tones associated with different base station identifiers having at most one tone in common, and wherein M is a positive integer greater than 2. Operation proceeds from step 1404 to step 1406. In step 1406, the wireless terminal stores beacon signal sequence information indicating an order in which tones in a tone set corresponding to a base station identifier are to be transmitted before said sequence is repeated. Operation proceeds from step 1406 to step 1408.

In step 1408 the wireless terminal receives beacon signals transmitted on tones. Operation proceeds from steps 1408 to steps 1410 and 1412. In step 1410, the wireless terminal recovers base station identification information from a sequence of received beacon signals using stored information and information determined by said receiver indicating the tones on which the beacon signals were received. Step 1410 includes sub-step 1414 in which the wireless terminal determines which base station identifier corresponds to two different received beacon signals transmitted on different tones by a transmitter. In some embodiments, recovering base station identification information includes, at times, using signal strength measurement information to identify beacon signals from the same transmitter when beacon signals are received from multiple different transmitters.

Returning to step 1412, in step 1412, the wireless terminal recovers timing information indicating a point in a recurring downlink timing structure corresponding to a point at which at least one beacon signal was transmitted. Operation proceeds from step 1410 and step 1412 to step 1408.

In some embodiments, each of the tones in a set of M tones associated with a base station identifier is included at least twice during said repeating sequence, the pattern of consecutive beacon signals in a transmitted sequence communicating timing information in a beacon signal timing structure.

In various embodiments, for each set of M tones corresponding to a base station identifier there is a difference between the lowest and the highest frequency tone of at least 10 tones thereby providing frequency diversity. In some embodiments, within the first set of tones the difference between the highest frequency tone and the lowest frequency tone is at least 30 tones thereby providing frequency diversity.

In some embodiments, each of the tones of the sets of M tones are members of a third set of tones, the third set of tones being tones which can be used to transmit beacon signals, and the third set of tones includes less than 70 percent of the set of downlink tones. For example, in one exemplary embodiment, M=4, the third set of tones which can be used as beacon tones is 64 and set of downlink tones is 113.

Features of various embodiments will be described. An exemplary beacon coding scheme can be used to signal base station identification (BS ID) information, e.g., cell and/or sector information, in the downlink direction in a wireless communications system, e.g. an OFDM mobile system such as an OFDM system. The exemplary mapping of tone indexes to physical tones provides frequency diversity. For an embodiment using single sector base stations, a BS ID, communicated via beacon signaling, may correspond to a base station. For an embodiment using multi-sector base stations, a BS ID may correspond to a base station sector transmitter module or sub-module. For example a three sector base station can have three different BS IDs, one communicated for each base station sector. Beacons, in various embodiments, carry information about BS ID (slope/sector) and some sync information that can be used to sync to ultra slot in the downlink. Slope is sometimes referred to as a term for a base station cell identifier.

The exemplary proposed beacon coding scheme has the advantage of conveying information more reliably than other schemes, which do not use redundancy, because the exemplary proposed scheme uses some redundancy. In addition, the proposed scheme has the potential to deliver information faster than other known beacon coding schemes thus reducing the average decode waiting time.

The exemplary method allows for the detection of up to 2 different BSs even if their corresponding beacon symbols collide in time.

The exemplary method has a beacon BS ID detection average waiting time of 2 beacon slots and a 2.5 beacon slots wait time for obtaining slot timing information.

An exemplary beacon detector in accordance with the exemplary method has low complexity since detection can be implemented using look-ups.

In one exemplary embodiment, a set of 64 beacon tones are used. With the primary set of N=64 beacon tones we can obtain W=96*3=288 subsets of 4 different tone indexes (the example is shown below). In the example, S is the set of available subsets of 4 tone indexes.

S={0 8 48 60, 0 11 12 55, 0 13 15 58, 0 6 17 25, 0 19 20 24, 0 21 22 23, 0 16 26 27, 0 28 29 30, 0 31 32 33, 0 9 34 36, 0 37 38 39, 0 40 41 42, 0 43 44 45, 0 7 46 47, 0 14 50 51, 0 52 53 54, 0 10 56 57, 0 35 49 59, 0 61 62 63, 1 4 48 55, 1 13 19 25, 1 16 22 28, 1 31 34 37, 1 40 43 46, 1 10 14 52, 1 5 49 61, 1 17 20 58, 1 23 26 29, 1 9 32 38, 1 41 44 47, 1 50 53 56, 1 8 11 59, 1 18 35 62, 1 6 15 24, 1 21 27 30, 1 33 36 39, 1 7 42 45, 1 51 54 57, 1 12 60 63, 4 13 59 63, 4 17 22 31, 4 9 24 26, 4 30 39 40, 4 8 14 44, 4 7 12 53, 4 49 57 58, 4 6 23 62, 4 19 27 36, 4 28 37 41, 4 32 45 50, 4 46 52 60, 4 11 51 61, 4 10 15 35, 4 16 20 34, 4 21 25 33, 4 29 38

42, 4 43 47 54, 7 8 57 62, 28 33 43 62, 27 38 52 62, 13 34 50 62, 11 17 41 62, 24 39 49 62, 10 12 21 62, 19 29 31 62, 16 45 60 62, 9 40 53 62, 14 47 58 62, 15 22 51 62, 25 26 37 62, 20 32 59 62, 36 42 54 62, 30 44 46 62, 5 55 56 62, 12 34 44 49, 25 42 49 60, 17 27 43 49, 15 29 49 53, 22 32 47 49, 9 14 28 49, 11 19 46 49, 10 37 45 49, 13 30 49 54, 8 26 33 49, 20 40 49 51, 21 41 49 50, 7 31 49 52, 16 38 49 56, 6 36 49 55, 23 48 49 63, 25 38 44 51, 8 15 38 43, 7 20 21 38, 10 11 13 38, 36 38 47 60, 26 38 46 50, 12 17 28 38, 14 31 38 40, 19 22 38 53, 30 38 45 55, 33 38 41 63, 23 34 38 54, 6 38 57 59, 24 38 48 58, 10 20 26 36, 7 13 28 36, 13 22 26 40, 8 22 30 36, 12 15 36 40, 17 36 45 51, 36 44 53 59, 11 21 31 36, 36 43 50 63, 14 23 25 36, 24 36 41 52, 36 37 46 58, 29 32 36 57, 11 26 45 53, 15 26 31 44, 26 30 41 57, 7 26 51 63, 12 14 26 54, 26 28 59 60, 21 26 43 58, 17 26 32 52, 19 26 34 47, 14 15 41 45, 14 19 30 63, 15 19 21 60, 14 17 21 59, 11 15 32 63, 11 14 34 57, 21 34 40 45, 19 28 45 57, 17 40 57 63, 21 28 44 63, 15 20 28 54, 15 25 46 57, 11 25 28 40, 21 24 53 57, 25 34 53 63, 22 24 45 63, 24 28 34 46, 21 32 46 54, 28 32 53 58, 32 34 51 60, 7 14 32 43, 8 19 32 40, 30 43 53 60, 13 14 24 60, 14 46 53 55, 13 32 41 55, 8 13 17 53, 8 10 46 63, 10 41 51 53, 8 28 51 55, 5 8 34 41, 10 34 43 55, 31 54 55 63, 8 25 45 54, 24 31 43 51, 10 28 31 47, 31 45 46 59, 16 25 31 41, 19 41 43 59, 5 31 57 60, 20 23 31 53, 8 12 31 58, 12 23 41 46, 13 23 43 57, 5 20 25 43, 5 13 46 51, 5 10 23 32, 10 17 24 42, 8 23 24 56, 23 30 51 59, 5 12 24 59, 24 40 47 55, 17 23 55 60, 25 55 58 59, 10 16 40 59, 7 15 16 55, 11 16 24 54, 16 17 29 46, 5 17 19 54, 5 16 58 63, 8 16 21 39, 12 16 19 51, 21 29 47 51, 5 39 47 53, 15 47 56 59, 7 34 39 59, 26 39 42 55, 23 28 39 52, 23 27 45 47, 19 23 42 58, 16 32 42 44, 5 28 42 50, 5 7 11 30, 30 31 42 56, 16 30 47 50, 15 23 37 50, 7 23 35 40, 5 40 44 52, 19 50 52 55, 5 15 27 33, 5 14 22 37, 5 35 36 48, 16 35 37 53, 35 42 47 63, 13 21 37 42, 8 37 47 52, 11 42 43 52, 16 48 52 57, 12 33 47 57, 9 16 23 33, 9 21 35 55, 12 30 35 52, 13 33 45 52, 9 51 52 58, 20 52 56 63, 14 20 33 42, 13 20 47 48, 13 27 31 35, 8 20 35 50, 9 20 30 37, 2 12 20 45, 5 9 29 45, 12 27 32 37, 2 9 17 47, 9 15 42 48, 9 12 13 56, 2 8 27 42, 2 16 18 36, 2 15 52 61, 2 7 24 37, 2 11 23 44, 2 10 30 58, 2 33 35 51, 2 31 48 50, 2 32 39 56, 12 39 43 48, 35 39 45 58, 17 35 44 56, 2 22 54 59, 17 33 37 48, 29 37 43 56, 2 29 40 60, 12 25 29 50, 18 29 52 59, 24 29 35 61, 20 22 29 55, 13 29 39 44, 29 33 34 58, 14 27 29 48, 24 33 44 50, 10 19 44 48, 7 19 33 56, 7 10 29 54, 7 22 25 48, 7 17 50 61, 12 22 42 61, 6 22 34 52, 3 22 35 43, 10 22 33 60, 9 22 50 57, 11 22 56 58, 9 10 25 39, 22 27 39 46, 20 39 57 61, 11 39 50 60, 27 40 50 58, 3 7 44 58, 20 27 44 60, 7 9 41 60, 6 35 54 60, 9 44 54 61, 18 41 54 58, 3 37 40 54, 6 9 27 63, 6 16 43 61, 3 6 8 29, 6 10 18 50, 6 40 48 56, 27 41 56 61, 18 37 60 61, 3 25 47 61, 3 11 18 48}

The following shows the possible correspondence of tone indexes to the physical tones, e.g., in an exemplary OFDM system. The exemplary OFDM system has, e.g., 113 tones in a downlink tone block:

index2phy={0 1 2 3 4 6 8 10 12 14 16 17 19 21 23 25 27 29 31 33 34 36 37 39 41 43 44 45 47 49 51 53 55 57 59 61 62 64 66 68 69 71 73 75 77 79 81 83 85 87 89 91 93 95 97 99 100 102 104 105 107 109 111 112}.

The resulting physical tone set, PHY, is shown below PHY={0 12 85 107, 0 17 19 99, 0 21 25 104, 0 8 29 43, 0 33 34 41, 0 36 37 39, 0 27 44 45, 0 47 49 51, 0 53 55 57, 0 14 59 62, 0 64 66 68, 0 69 71 73, 0 75 77 79, 0 10 81 83, 0 23 89 91, 0 93 95 97, 0 16 100 102, 0 61 87 105, 0 109 111 112, 1 4 85 99, 1 21 33 43, 1 27 37 47, 1 53 59 64, 1 69 75 81, 1 16 23 93, 1 6 87 109, 1 29 34 104, 1 39 44 49, 1 14 55 66, 1 71 77 83, 1 89 95 100, 1 12 17 105, 1 31 61 111, 1 8 25 41, 1 36 45 51, 1 57 62 68, 1 10 73 79, 1 91 97 102, 1 19 107 112, 4 21 105 112, 4 29 37 53, 4 14 41 44, 4 51 68 69, 4 12 23 77, 4 10 19 95, 4 87 102 104, 4 8 39 111, 4 33 45 62, 4 47 64 71, 4 55 79 89, 4 81 93 107, 4 17 91 109, 4 16 25 61, 4 27 34 59, 4 36 43 57, 4 49 66 73, 4 75 83 97, 10 12 102 111, 47 57 75 111, 45 66 93 111, 21 59 89 111, 17 29 71 111, 41 68 87 111, 16 19 36 111, 33 49 53 111, 27 79 107 111, 14 69 95 111, 23 83 104 111, 25 37 91 111, 43 44 64 111, 34 55 105 111, 62 73 97 111, 51 77 81 111, 6 99 100 111, 19 59 77 87, 43 73 87 107, 29 45 75 87, 25 49 87 95, 37 55 83 87, 14 23 47 87, 17 33 81 87, 16 64 79 87, 21 51 87 97, 12 44 57 87, 34 69 87 91, 36 71 87 89, 10 53 87 93, 27 66 87 100, 8 62 87 99, 39 85 87 112, 43 66 77 91, 12 25 66 75, 10 34 36 66, 16 17 21 66, 62 66 83 107, 44 66 81 89, 19 29 47 66, 23 53 66 69, 33 37 66 95, 51 66 79 99, 57 66 71 112, 39 59 66 97, 8 66 102 105, 41 66 85 104, 16 34 44 62, 10 21 47 62, 21 37 44 69, 12 37 51 62, 19 25 62 69, 29 62 79 91, 62 77 95 105, 17 36 53 62, 62 75 89 112, 23 39 43 62, 41 62 71 93, 62 64 81 104, 49 55 62 102, 17 44 79 95, 25 44 53 77, 44 51 71 102, 10 44 91 112, 19 23 44 97, 44 47 105 107, 36 44 75 104, 29 44 55 93, 33 44 59 83, 23 25 71 79, 23 33 51 112, 25 33 36 107, 23 29 36 105, 17 25 55 112, 17 23 59 102, 36 59 69 79, 33 47 79 102, 29 69 102 112, 36 47 77 112, 25 34 47 97, 25 43 81 102, 17 43 47 69, 36 41 95 102, 43 59 95 112, 37 41 79 112, 41 47 59 81, 36 55 81 97, 47 55 95 104, 55 59 91 107, 10 23 55 75, 12 33 55 69, 51 75 95 107, 21 23 41 107, 23 81 95 99, 21 55 71 99, 12 21 29 95, 12 16 81 112, 16 71 91 95, 12 47 91 99, 6 12 59 71, 16 59 75 99, 53 97 99 112, 12 43 79 97, 41 53 75 91, 16 47 53 83, 53 79 81 105, 27 43 53 71, 33 71 75 105, 6 53 102 107, 34 39 53 95, 12 19 53 104, 19 39 71 81, 21 39 75 102, 6 34 43 75, 6 21 81 91, 6 16 39 55, 16 29 41 73, 12 39 41 100, 39 51 91 105, 6 19 41 105, 41 69 83 99, 29 39 99 107, 43 99 104 105, 16 27 69 105, 10 25 27 99, 17 27 41 97, 27 29 49 81, 6 29 33 97, 6 27 104 112, 12 27 36 68, 19 27 33 91, 36 49 83 91, 6 68 83 95, 25 83 100 105, 10 59 68 105, 44 68 73 99, 39 47 68 93, 39 45 79 83, 33 39 73 104, 27 55 73 77, 6 47 73 89, 6 10 17 51, 51 53 73 100, 27 51 83 89, 25 39 64 89, 10 39 61 69, 6 69 77 93, 33 89 93 99, 6 25 45 57, 6 23 37 64, 6 61 62 85, 27 61 64 95, 61 73 83 112, 21 36 64 73, 12 64 83 93, 17 73 75 93, 27 85 93 102, 19 57 83 102, 14 27 39 57, 14 36 61 99, 19 51 61 93, 21 57 79 93, 14 91 93 104, 34 93 100 112, 23 34 57 73, 21 34 83 85, 21 45 53 61, 12 34 61 89, 14 34 51 64, 2 19 34 79, 6 14 49 79, 19 45 55 64, 2 14 29 83, 14 25 73 85, 14 19 21 100, 2 12 45 73, 2 27 31 62, 2 25 93 109, 2 10 41 64, 2 17 39 77, 2 16 51 104, 2 57 61 91, 2 53 85 89, 2 55 68 100, 19 68 75 85, 61 68 79 104, 14 29, 61 77 100, 2 37 97 105, 29 57 64 85, 49 64 75 100, 2 49 69 107, 19 43 49 89, 31 49 93 105, 41 49 61 109, 34 37 49 99, 21 49 68 77, 49 57 59 104, 23 45 49 85, 41 57 77 89, 16 33 77 85, 10 33 57 100, 10 16 49 97, 10 37 43 85, 10 29 89 109, 19 37 73 109, 8 37 59 93, 3 37 61 75, 16 37 57 107, 14 37 89 102, 17 37 100 104, 14 16 43 68, 37 45 68 81, 34 68 102 109, 17 68 89 107, 45 69 89 104, 3 10 77 104, 34 45 77 107, 10 14 71 107, 8 61 97 107, 14 77 97 109, 31 71 97 104, 3 64 69 97, 8 14 45 112, 8 27 75 109, 3 8 12 49, 8 16 31 89, 8 69 85 100, 45 71 100 109, 31 64 107 109, 3 43 83 109, 3 17 31 85} which includes 288 subsets (W=288) of 4 physical tones each.

Lets denote subsets of S as Sn={An,Bn,Cn,Dn}, where n=[0; W-1] and An through Dn are beacon tones used to encode base station information, e.g., BS ID. These tones are taken from the primary set of N=64 tones.

Each subset Sn can therefore uniquely identify the BS slope/sector information (96 slopes, 3 sectors each). Where the slope may be interpreted as a base station identifier. The major properties of this set are:

for the same n all four tones An,Bn,Cn,Dn in a subset are different;
 if Sn and Sm are the two different subsets (n!=m) than they have no more than one common tone.

Max(An,Bn,Cn,Dn)−Min(An,Bn,Cn,Dn)>=22 for every n=[0; W-1]

After projecting index subsets Sn to physical tone subsets PHYn using indexing rule index2phy{ } the first 2 properties hold whereas the third becomes:

Max(APn,BPn,CPn,DPn)−Min(APn,BPn,CPn,DPn)>=39 for every n=[0; W-1] where we denote PHYn={APn,BPn,CPn,DPn}. That ensures sufficient amount of frequency diversity.

The appropriate choice of index subsets Sn together with mapping rule index2phy{ } ensures also that for any given 3 distinct tones in PHYn the frequency offset by 1 tone does not create another valid combination of 3 tones that could be found in the PHY. That eliminates the appearance of "ghost BS" when frequency offset of 1 tone is present.

Since no two subsets have more than 1 common tone we can identify BS ID by knowing any 2 different tones from the corresponding subset (not necessarily followed one another in time). Decode waiting time for the proposed scheme is 2 beacon slots which is advantageously relatively short.

Ultraslot beacon sequence can be, and sometimes is organized as shown below.

If we want to use a beacon ultra slot period of 18 beacons we can use the 4 tones that constitute subset Sn the following way as indicated in Table 1:

TABLE 1

| Beacon slot count t | | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Beacon tone index | A | B | C | A | D | B | A | C | D | A | B | D | A | C | B | A | D | C |

This sequence has a property that by looking at any 3 consecutive tones one can uniquely identify t mod 18. Say if one sees "A C D" than be can conclude that t=6 Thus time position can be determined.

This can be seen from Table 2 below:

TABLE 2

| Triple observed | T |
|---|---|
| ABC | 0 |
| BCA | 1 |
| CAD | 2 |
| ADB | 3 |
| DBA | 4 |
| BAC | 5 |
| ACD | 6 |
| CDA | 7 |
| DAB | 8 |
| ABD | 9 |
| BDA | 10 |
| DAC | 11 |
| ACB | 12 |
| CBA | 13 |
| BAD | 14 |
| ADC | 15 |
| DCA | 16 |
| CAB | 17 |

It is also important that every triple in Table 2 above always has distinct beacon tones. This property can be used to detect beacons coming from 2 BS that collide in time, as explained below.

Another advantageous property of this sequence is that there is a 50% chance of identifying "t" by knowing only 2 consecutive tones. In the remaining 50% of cases there is an ambiguity of 2 and the observer will have to wait for the third tone to come before determining the time position within the recurring timing structure. This property can be seen from the following Table 3:

TABLE 3

| Pair observed | T |
|---|---|
| A B | 0 or 9 |
| A C | 6 or 12 |
| A D | 3 or 15 |
| B A | 5 or 14 |
| B C | 1 |
| B D | 10 |
| C A | 2 or 17 |
| C B | 13 |
| C D | 7 |
| D A | 8 or 11 |
| D B | 4 |
| D C | 16 |

Thus this method facilitates rapid determination of time position within a recurring timing structure being used by a base station sector transmitter, e.g., facilitating rapid access and/or rapid handoff.

In some embodiments, a different ultra-slot period is utilized. For example, if ultra slot period can be reduced from 18 to 10 beacon slots then it is possible to uniquely identify t by observing any 2 consecutive beacon tones. The corresponding sequence can be structured to look like the representation of Table 4:

TABLE 4

| Beacon slot count t | | | | | | | | | | |
|---|---|---|---|---|---|---|---|---|---|---|
| | 0 | 1 | 2 | 3 | 4 | 5 | 6 | 7 | 8 | 9 |
| Beacon tone | A | B | C | D | B | A | D | C | B | D |

The table below (Table 5) shows the correspondence between the pair of beacon tones observed and t:

TABLE 5

| Pair observed | t |
|---|---|
| A B | 0 |
| A D | 5 |
| B A | 4 |
| B C | 1 |
| B D | 8 |
| C B | 7 |
| C D | 2 |
| D A | 9 |
| D B | 3 |
| D C | 6 |

The table below (Table 6) shows the correspondence between observed triples of beacon tones and t.

TABLE 6

| Triple observed | t |
|---|---|
| A B C | 0 |
| A D C | 5 |
| B A D | 4 |
| B C D | 1 |
| B D A | 8 |
| C B D | 7 |
| C D B | 2 |
| D A B | 9 |
| D B A | 3 |
| D C B | 6 |

The proposed beacon coding scheme also gives the ability to identify 2 BS that collide in time (i.e. 2 beacons appear at the same OFDM symbol interval) if the observer has 3 consecutive beacon tones in his possession. This has the advantages over beacon schemes that do not provide redundancy. This property can be explained with the following example. Suppose an observer, e.g., a wireless terminal, sees tones from 3 consequent beacon slots n, n+1, n+2 and knows the two biggest tones at every beacon slot:

TABLE 7

| | Beacon slot count | | |
|---|---|---|---|
| | n | n + 1 | n + 2 |
| Biggest tone | E | F | G |
| Second biggest tone | I | J | K |

Let's assume initially that all 6 tones in Table 7 above are different. Since we do not know which triple(s) constitute a valid BS ID sequence we need to consider all 8 possible combinations that contain 3 distinct tones (EFG EFK EJG EJK IFG IFK IJG IJK) out of which only one or two correspond to valid BS ID.
In the method discussed herein there is coding redundancy. The discussed method can resolve the BS ID since we know that no 2 subsets of 4 tones can have more than 1 common tone and all three tones in a triple are distinct. Suppose the valid combinations (in the above example) are (EFG) and (IJK). It is evident that the remaining 6 combinations (EFK EJG EJK IFG IFK IJG) cannot be valid ones since they always have 2 common tones with two valid combinations (EFG and IJK) which is impossible. Detection becomes simpler if some of the 6 tones seen are the same beacon tones. It reduces the amount of combinations to less then 8. The following example clarifies this:

TABLE 8

| | Beacon slot count | | |
|---|---|---|---|
| | n | n + 1 | n + 2 |
| Biggest tone | E | F | G |
| Second biggest tone | I | J | E |

In this example, of Table 8 only 6 candidate triples should be considered (EFG EJG IFG IFE IJG IGE). The other 2 combinations (EFE EJE) can be excluded from the consideration since they are invalid.
Exemplary detection will now be described. An exemplary detector can be, and sometimes is, very simple. Suppose you have N=64 lists (each list corresponds to single beacon tone) that contains the BS ID identifiers in the form K=slope_index*3+sector=[0:287] for the slopes/sectors this tone participates in. Then you can decode slope/sector by finding the intersection of the 2 lists, which is always unique.
So you can obtain slope/sector info, if you know any 2 different tones from the subset (A, B, C, D). This allows decoding wait interval to be a relatively short 2 beacon slots.
To detect BS ID we can make 8 look-ups (for all 8 possible combinations) and find which 1 or 2 are valid. The detector can always decide (by looking at relative strength of the second biggest tone) which way to go: to try to decode and recover information corresponding to two base stations or one base station.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.
In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.
While described in the context of an OFDM system, at least some of the methods and apparatus of various embodiments, are applicable to a wide range of communications systems including many non-OFDM and/or non-cellular systems.
Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of communicating base station identification information, the method comprising:
storing information indicating a first set of M tones used for communicating base station identification information, wherein M is a positive integer greater than two; and
transmitting with a transmitter a first repeating sequence of beacon signals, each of said beacon signals using one of said first set of M tones, each of said tones in said first set of M tones being transmitted at least twice during said first repeating sequence, a pattern of consecutive beacon signals in said transmitted sequence communicating timing information in a beacon signal timing structure.

2. The method of claim 1, wherein the information communicated using said first set of M tones includes base station type and first sector information, and the method further comprising:
storing information indicating a second set of M tones used for communicating base station identification information including base station and sector information, said sector information indicating a different sector than said first sector information, said second set of M tones having at most one tone in common with said first set of M tones; and
transmitting a second repeating sequence of beacon signals, each of said beacon signals using one of said second set of M tones, each of said tones in said second set of M tones being transmitted at least twice during said second repeating sequence, a pattern of consecutive beacon signals in said transmitted second sequence communicating timing information in said beacon signal timing structure.

3. The method of claim 2,
wherein the M tones in said first subset are different from one another; and
wherein the M tones in said second subset are different from one another.

4. The method of claim 3, wherein within the first set of tones the difference between the highest frequency tone and the lowest frequency tone is at least 10 tones thereby providing frequency diversity.

5. The method of claim 3, wherein within the first set of tones the difference between the highest frequency tone and the lowest frequency tone is at least 30 tones thereby providing frequency diversity.

6. The method of claim 5, wherein said first and second sets of tones are members of a third set of tones, said third set of tones being tones which can be used to transmit beacon signals, said third set of tones being a subset of a set of downlink tones, said third set of tones including less than 70 percent of said set of downlink tones.

7. The method of claim 5, wherein M is equal to 4 and wherein a time position within the beacon signal timing structure is communicated in each set of three consecutive transmitted beacon signals from said first set of beacon signals.

8. The method of claim 7, wherein the first and second transmitted sequences each include the same number of beacon signals.

9. The method of claim 8, wherein the number of beacon signals in each of said first and second transmitted sequences is 18.

10. A base station, comprising:
memory including stored information indicating a first set of M tones used for communicating base station identification information, wherein M is a positive integer greater than two;
a transmitter for transmitting beacon signals; and
a transmitter control module for controlling the transmitter to transmit a first repeating sequence of beacon signals, each of said beacon signals using one of said first set of M tones, each of said tones in said first set of M tones being transmitted at least twice during said first repeating sequence, a pattern of consecutive beacon signals in said transmitted sequence communicating timing information in a beacon signal timing structure.

11. The base station of claim 10,
wherein the information communicated using said first set of M tones includes base station type and first sector information,
wherein memory further comprises stored information indicating a second set of M tones used for communicating base station identification information including base station and sector information, said sector information indicating a different sector than said first sector information, said second set of M tones having at most one tone in common with said first set of M tones; and
wherein said transmitter control module further controls the transmitter to transmit a second repeating sequence of beacon signals, each of said beacon signals using one of said second set of M tones, each of said second set of tones in said second set of M tones being transmitted at least twice during said second repeating sequence, a pattern of consecutive beacon signals in said transmitted second sequence communicating timing information in said beacon signal timing structure.

12. The base station of claim 11,
wherein the M tones in said first subset are different from one another; and
wherein the M tones in said second subset are different from one another.

13. The base station of claim 12, wherein within the first set of tones the difference between the highest frequency tone and the lowest frequency tone is at least 10 tones thereby providing frequency diversity.

14. The base station of claim 13, wherein within the first set of tones the difference between the highest frequency tone and the lowest frequency tone is at least 30 tones thereby providing frequency diversity.

15. The base station of claim 14,
wherein said first and second sets of tones are members of a third set of tones, said third set of tones being tones which can be used to transmit beacon signals, said third set of tones being a subset of a set of downlink tones, said third set of tones including less than 70 percent of said set of downlink tones.

16. The base station of claim 14, wherein M is equal to 4 and wherein a time position within the beacon signal timing structure is communicated in each set of three consecutive transmitted beacon signals from said first set of beacon signals.

17. The base station of claim 16, wherein the first and second transmitted sequences each include the same number of beacon signals.

18. The base station of claim 17, wherein the number of beacon signals in each of said first and second transmitted sequences is 18.

19. A base station, comprising:
memory means for storing information indicating a first set of M tones used for communicating base station identification information, wherein M is a positive integer greater than two;

transmitter means for transmitting beacon signals; and
transmitter control means for controlling the transmitter means to transmit a first repeating sequence of beacon signals, each of said beacon signals using one of said first set of M tones, each of said tones in said first set of M tones being transmitted at least twice during said first repeating sequence, a pattern of consecutive beacon signals in said transmitted sequence communicating timing information in a beacon signal timing structure.

20. The base station of claim 19,
wherein the information communicated using said first set of M tones includes base station type and first sector information,
wherein said memory means further comprises stored information indicating a second set of M tones used for communicating base station identification information including base station and sector information, said sector information indicating a different sector than said first sector information, said second set of M tones having at most one tone in common with said first set of M tones; and
wherein said transmitter control means further controls the transmitter means to transmit a second repeating sequence of beacon signals, each of said beacon signals using one of said second set of M tones, each of said second set of tones in said second set of M tones being transmitted at least twice during said second repeating sequence, a pattern of consecutive beacon signals in said transmitted second sequence communicating timing information in said beacon signal timing structure.

21. The base station of claim 20,
wherein the M tones in said first subset are different from one another; and
wherein the M tones in said second subset are different from one another.

22. The base station of claim 21, wherein within the first set of tones the difference between the highest frequency tone and the lowest frequency tone is at least 10 tones thereby providing frequency diversity.

23. The base station of claim 21, wherein within the first set of tones the difference between the highest frequency tone and the lowest frequency tone is at least 30 tones thereby providing frequency diversity.

24. A computer readable non-transitory medium embodying machine executable instructions for implementing a method of communicating base station identification information, the method comprising:
storing information indicating a first set of M tones used for communicating base station identification information, wherein M is a positive integer greater than two; and
transmitting a first repeating sequence of beacon signals, each of said beacon signals using one of said first set of M tones, each of said tones in said first set of M tones being transmitted at least twice during said first repeating sequence, a pattern of consecutive beacon signals in said transmitted sequence communicating timing information in a beacon signal timing structure.

25. The computer readable medium of claim 24, wherein the information communicated using said first set of M tones includes base station type and first sector information, the computer readable medium further embodying machine executable instructions for:
storing information indicating a second set of M tones used for communicating base station identification information including base station and sector information, said sector information indicating a different sector than said first sector information, said second set of M tones having at most one tone in common with said first set of M tones; and
transmitting a second repeating sequence of beacon signals, each of said beacon signals using one of said second set of M tones, each of said tones in said second set of M tones being transmitted at least twice during said second repeating sequence, a pattern of consecutive beacon signals in said transmitted second sequence communicating timing information in said beacon signal timing structure.

26. The computer readable medium of claim 25,
wherein the M tones in said first subset are different from one another; and
wherein the M tones in said second subset are different from one another.

27. The computer readable medium of claim 26, wherein within the first set of tones the difference between the highest frequency tone and the lowest frequency tone is at least 10 tones thereby providing frequency diversity.

28. An apparatus comprising:
a processor configured to:
store information indicating a first set of M tones used for communicating base station identification information, wherein M is a positive integer greater than two; and
control transmitting of a first repeating sequence of beacon signals, each of said beacon signals using one of said first set of M tones, each of said tones in said first set of M tones being transmitted at least twice during said first repeating sequence, a pattern of consecutive beacon signals in said transmitted sequence communicating timing information in a beacon signal timing structure.

29. The apparatus of claim 28, wherein the information communicated using said first set of M tones includes base station type and first sector information, the process further configured to:
store information indicating a second set of M tones used for communicating base station identification information including base station and sector information, said sector information indicating a different sector than said first sector information, said second set of M tones having at most one tone in common with said first set of M tones; and
control transmitting of a second repeating sequence of beacon signals, each of said beacon signals using one of said second set of M tones, each of said tones in said second set of M tones being transmitted at least twice during said second repeating sequence, a pattern of consecutive beacon signals in said transmitted second sequence communicating timing information in said beacon signal timing structure.

30. The apparatus of claim 29,
wherein the M tones in said first subset are different from one another; and
wherein the M tones in said second subset are different from one another.

31. The apparatus of claim 30, wherein within the first set of tones the difference between the highest frequency tone and the lowest frequency tone is at least 10 tones thereby providing frequency diversity.

32. A method of receiving and recovering base station identification information, the method comprising:
storing information in a receiver indicating mappings between beacon tones and base station identifiers, for each base station identifier said information indicating a mapping to a set of M tones, each of the M tones in a set of M tones associated with a base station identifier being different; sets of M tones associated with different base station identifiers having at most one tone in common, wherein M is a positive integer greater than two;

receiving beacon signals transmitted on tones in said receiver; and recovering base station identification information from a sequence of received beacon signals using said stored information and information determined by said receiver indicating the tones on which the beacon signals were received.

33. The method of claim 32, further comprising:

storing beacon signal sequence information indicating an order in which tones in a tone set corresponding to a base station identifier are to be transmitted before said sequence is repeated.

34. The method of claim 32, wherein recovering base station identification information includes determining which base station identifier corresponds to two different received beacon signals transmitted on different tones by a transmitter.

35. The method of claim 34, wherein recovering base station identification information includes using signal strength to identify beacon signals from the same transmitter when beacon signals are received from multiple different transmitters.

36. The method of claim 32, further comprising:

recovering timing information indicating a point in a recurring downlink timing structure corresponding to a point at which at least one beacon signal was transmitted.

37. The method of claim 34, wherein each of said tones in a set of M tones associated with a base station identifier is included at least twice during said repeating sequence, the pattern of consecutive beacon signals in said transmitted sequence communicating timing information in a beacon signal timing structure.

38. The method of claim 34, wherein with each set of M tones corresponding to a base station identifier there is a difference between the highest frequency tone and the lowest frequency tone of at least 10 tones thereby providing frequency diversity.

39. The method of claim 34, wherein within the first set of tones the difference between the highest frequency tone and the lowest frequency tone is at least 30 tones thereby providing frequency diversity.

40. The method of claim 36, wherein each of said sets of tones are members of a third set of tones, said third set of tones being tones which can be used to transmit beacon signals, said third set of tones being a subset of a set of downlink tones, said third set of tones including less than 70 percent of said set of downlink tones.

41. A wireless terminal for receiving and recovering base station identification information, comprising:

memory for storing information indicating mappings between beacon tones and base station identifiers, for each base station identifier said information indicating a mapping to a set of M tones, each of the M tones in a set of M tones associated with a base station identifier being different; sets of M tones associated with different base station identifiers having at most one tone in common, wherein M is a positive integer greater than two;

a receiver for receiving beacon signals transmitted on tones; and a recovery module for recovering base station identification information from a sequence of received beacon signals using said stored information and information determined by said receiver indicating the tones on which the beacon signals were received.

42. The wireless terminal of claim 41, wherein said memory further comprises:

stored beacon signal sequence information indicating an order in which tones in a tone set corresponding to a base station identifier are to be transmitted before said sequence is repeated.

43. The wireless terminal of claim 41, wherein said recovery module includes a tone to base station identification information mapping module for determining which base station identifier corresponds to two different received beacon signals transmitted on different tones by a transmitter.

44. The wireless terminal of claim 43, wherein said recovery module further includes a beacon signal to base station source determination module for using signal strength to identify beacon signals from the same transmitter when multiple beacon signals are received from different transmitters during the same symbol time period.

45. The wireless terminal of claim 41, wherein said recovery module further includes:

a timing information recovery module for recovering timing information indicating a point in a recurring downlink timing structure corresponding to a point at which at least one beacon signal was transmitted.

46. The wireless terminal of claim 43, wherein each of said tones in a set of M tones associated with a base station identifier is included at least twice during said repeating sequence, the pattern of consecutive beacon signals in said transmitted sequence communicating timing information in a beacon signal timing structure.

47. The wireless terminal of claim 43, wherein with each set of M tones corresponding to a base station identifier there is a difference between the highest frequency tone and the lowest frequency tone of at least 10 tones thereby providing frequency diversity.

48. The wireless terminal of claim 43, wherein within the first set of tones the difference between the highest frequency tone and the lowest frequency tone is at least 30 tones thereby providing frequency diversity.

49. The wireless terminal of claim 45, wherein each of said sets of tones are members of a third set of tones, said third set of tones being tones which can be used to transmit beacon signals, said third set of tones being a subset of a set of downlink tones, said third set of tones including less than 70 percent of said set of downlink tones.

50. A wireless terminal for receiving and recovering base station identification information, the wireless terminal comprising:

memory means for storing information indicating mappings between beacon tones and base station identifiers, for each base station identifier said information indicating a mapping to a set of M tones, each of the M tones in a set of M tones associated with a base station identifier being different; sets of M tones associated with different base station identifiers having at most one tone in common, wherein M is a positive integer greater than two;

receiver means for receiving beacon signals transmitted on tones; and recovery means for recovering base station identification information from a sequence of received beacon signals using said stored information and information determined by said receiver indicating the tones on which the beacon signals were received.

51. The wireless terminal of claim 50, wherein said memory means further comprises:
  stored beacon signal sequence information indicating an order in which tones in a tone set corresponding to a base station identifier are to be transmitted before said sequence is repeated.

52. The wireless terminal of claim 50, wherein said recovery means includes tone to base station identification information mapping means for determining which base station identifier corresponds to two different received beacon signals transmitted on different tones by a transmitter.

53. The wireless terminal of claim 52, wherein said recovery means further includes a beacon signal to base station source determination means for using signal strength to identify beacon signals from the same transmitter when multiple beacon signals are received from different transmitters during the same symbol time period.

54. The wireless terminal of claim 50, wherein said recovery means further includes:
  timing information recovery means for recovering timing information indicating a point in a recurring downlink timing structure corresponding to a point at which at least one beacon signal was transmitted.

55. A computer readable non-transitory medium embodying machine executable instructions for implementing a method of receiving and recovering base station identification information, the method comprising:
  storing information in a receiver indicating mappings between beacon tones and base station identifiers, for each base station identifier said information indicating a mapping to a set of M tones, each of the M tones in a set of M tones associated with a base station identifier being different; sets of M tones associated with different base station identifiers having at most one tone in common, wherein M is a positive integer greater than two;
  receiving beacon signals transmitted on tones in said receiver; and
  recovering base station identification information from a sequence of received beacon signals using said stored information and information determined by said receiver indicating the tones on which the beacon signals were received.

56. The computer readable medium of claim 55, further embodying machine executable instructions for:
  storing beacon signal sequence information indicating an order in which tones in a tone set corresponding to a base station identifier are to be transmitted before said sequence is repeated.

57. The computer readable medium of claim 55, further embodying machine executable instructions for:
  determining which base station identifier corresponds to two different received beacon signals transmitted on different tones by a transmitter as part of recovering base station identification information.

58. The computer readable medium of claim 57, further embodying machine executable instructions for:
  using signal strength to identify beacon signals from the same transmitter when beacon signals are received from multiple different transmitters as part of recovering base station identification information.

59. The computer readable medium of claim 55, further embodying machine executable instructions for:
  recovering timing information indicating a point in a recurring downlink timing structure corresponding to a point at which at least one beacon signal was transmitted.

60. An apparatus comprising:
  a processor configured to:
    store information in a receiver indicating mappings between beacon tones and base station identifiers, for each base station identifier said information indicating a mapping to a set of M tones, each of the M tones in a set of M tones associated with a base station identifier being different; sets of M tones associated with different base station identifiers having at most one tone in common, wherein M is a positive integer greater than two;
    receive beacon signals transmitted on tones in said receiver; and
    recover base station identification information from a sequence of received beacon signals using said stored information and information determined by said receiver indicating the tones on which the beacon signals were received.

61. The apparatus of claim 60, wherein said processor is further configured to:
  store beacon signal sequence information indicating an order in which tones in a tone set corresponding to a base station identifier are to be transmitted before said sequence is repeated.

62. The apparatus of claim 60, wherein said processor is further configured to:
  determine which base station identifier corresponds to two different received beacon signals transmitted on different tones by a transmitter as part of recovering base station identification information.

63. The apparatus of claim 62, wherein said processor is further configured to:
  use signal strength to identify beacon signals from the same transmitter when beacon signals are received from multiple different transmitters as part of recovering base station identification information.

64. The apparatus of claim 60, wherein said processor is further configured to:
  recover timing information indicating a point in a recurring downlink timing structure corresponding to a point at which at least one beacon signal was transmitted.

* * * * *